(12) United States Patent
Du et al.

(10) Patent No.: US 11,537,229 B2
(45) Date of Patent: Dec. 27, 2022

(54) TOUCH PAD PRESSURE DETECTION METHOD AND APPARATUS, STORAGE MEDIUM AND COMPUTER DEVICE

(71) Applicant: Beijing Taifang Technology Co., Ltd., Beijing (CN)

(72) Inventors: Chaoliang Du, Beijing (CN); Hongfeng Guo, Beijing (CN)

(73) Assignee: Beijing Taifang Technology Co., Ltd., Beijing (CN)

(*) Notice: Subject to any disclaimer, the term of this patent is extended or adjusted under 35 U.S.C. 154(b) by 0 days.

(21) Appl. No.: 17/424,030

(22) PCT Filed: Jan. 17, 2020

(86) PCT No.: PCT/CN2020/072785
§ 371 (c)(1),
(2) Date: Jul. 19, 2021

(87) PCT Pub. No.: WO2020/147840
PCT Pub. Date: Jul. 23, 2020

(65) Prior Publication Data
US 2022/0100308 A1     Mar. 31, 2022

(30) Foreign Application Priority Data

Jan. 17, 2019  (CN) .......................... 201910044023.5
Dec. 13, 2019  (CN) .......................... 201911284180.X

(51) Int. Cl.
*G06F 3/041*     (2006.01)

(52) U.S. Cl.
CPC .......... *G06F 3/0414* (2013.01); *G06F 3/0418* (2013.01); *G06F 2203/04105* (2013.01)

(58) Field of Classification Search
CPC ..................... G06F 3/0414; G06F 2203/04105
See application file for complete search history.

(56) References Cited

U.S. PATENT DOCUMENTS

| 5,914,465 | A   | * | 6/1999  | Allen   | ................. | G06F 3/04166 341/33 |
| 9,552,092 | B2  | * | 1/2017  | Seo     | ....................... | G06F 3/04166 |
| 2003/0210235 | A1 | * | 11/2003 | Roberts | ................. | G06F 3/0414 345/173 |

(Continued)

FOREIGN PATENT DOCUMENTS

| CN | 1596412 A   | 3/2005 |
| CN | 103019446 A | 4/2013 |

(Continued)

OTHER PUBLICATIONS

Chinese Office Action, Application No. 201910044023.5, dated Mar. 22, 2021.

(Continued)

*Primary Examiner* — Sepehr Azari
(74) *Attorney, Agent, or Firm* — Thomas | Horstemeyer, LLP

(57) ABSTRACT

A touch pad pressure detection method and apparatus, a storage medium and a computer device, wherein the method comprises: by means of an elastic wave sensor arranged below a touch pad, detecting a pressing operation on a touch pad to obtain a voltage signal; and determining pressure on the basis of the voltage signal.

18 Claims, 11 Drawing Sheets

(56) References Cited

U.S. PATENT DOCUMENTS

| | | | |
|---|---|---|---|
| 2005/0146511 A1* | 7/2005 | Hill | G06F 3/0436 345/173 |
| 2006/0284856 A1* | 12/2006 | Soss | G06F 3/0418 345/173 |
| 2006/0293864 A1* | 12/2006 | Soss | G06F 3/04144 702/104 |
| 2011/0175813 A1 | 7/2011 | Sarwar et al. | |
| 2012/0032907 A1* | 2/2012 | Koizumi | G06F 3/0414 345/173 |
| 2012/0256838 A1 | 10/2012 | Lee et al. | |
| 2013/0265273 A1* | 10/2013 | Marsden | G06F 3/0416 345/174 |
| 2016/0077615 A1* | 3/2016 | Schwarz | G06F 3/043 345/173 |
| 2016/0224168 A1* | 8/2016 | Watanabe | G06F 3/0445 |
| 2016/0357297 A1* | 12/2016 | Picciotto | G06F 3/0488 |
| 2017/0024038 A1* | 1/2017 | Noguchi | G06F 3/0412 |
| 2017/0285796 A1* | 10/2017 | Ramakrishnan | G06F 3/04144 |
| 2017/0344149 A1* | 11/2017 | Ramakrishnan | G06F 3/04166 |
| 2018/0059866 A1* | 3/2018 | Drake | G06F 3/0488 |
| 2018/0341363 A1* | 11/2018 | Wang | G06F 3/0447 |
| 2019/0294258 A1* | 9/2019 | Forlines | G06F 3/0202 |

FOREIGN PATENT DOCUMENTS

| | | |
|---|---|---|
| CN | 103197821 A | 7/2013 |
| CN | 103988433 A | 8/2014 |
| CN | 106449966 A | 2/2017 |
| CN | 206210845 A | 5/2017 |
| CN | 107300997 A | 10/2017 |
| CN | 107340912 A | 11/2017 |
| CN | 108052222 A | 5/2018 |
| CN | 108475140 A | 8/2018 |
| CN | 208335151 A | 1/2019 |

OTHER PUBLICATIONS

International Search Report, PCT/CN2020/072785, dated Apr. 20, 2020.

Wei, Xuan, "Structure Analyses and Optimizations of N-type Resistive and Full Flexible Capacitive Three-dimensional Force Tactile Sensor," University of Science and Technology of China, A dissertation for master's degree, May 8, 2015.

Zuerbig, V., et al., Tunable Multisegment SixNy/AlN Piezo Lenses for Wavefront Correction, 2015 18th International Conference on Solid-State Sensors, Actuators, and Microsystems, Transducers 2015, Anchorage, Alaksa, USA, Jun. 21-25, 2015 (pp. 2045-2048).

* cited by examiner

TOUCH PAD PRESSURE DETECTION METHOD AND APPARATUS, STORAGE MEDIUM AND COMPUTER DEVICE

CROSS-REFERENCE TO RELATED APPLICATIONS

The present application is a U.S. National Phase Entry of International Application No. PCT/CN2020/072785 having an international filing date of Jan. 17, 2020, which claims the priority of Chinese patent application No. 201910044023.5 filed on Jan. 17, 2019 and Chinese patent application No. 201911284180.X filed on Dec. 13, 2019. The entire contents of the above-identified applications are hereby incorporated by reference.

TECHNICAL FIELD

The present disclosure relates to, but is not limited to, electromechanical interactive techniques, in particular to a method for detecting pressing force on a touch pad, an apparatus for detecting pressing force on a touch pad, a storage medium, and a computer device.

BACKGROUND

Currently main operations of electronic devices such as portable cell phones and tablet computers on the market are completed through touch screens. Touch screens are becoming more and more popular because of their easy operations and lower and lower prices, and their unique advantages may help users achieve the same operation purposes without frequently moving a mouse and tapping a keyboard. A touch screen generally includes a touch pad, a touch response component, a touch control system, a driver, and so on. Main technical solutions adopted by a touch response component include resistance type, capacitance type, infrared type, surface acoustic wave type, and so on. Apart from limitations of self-generation technology, these technical solutions all have a common disadvantage, that is, they usually only provide position information (X, Y), but cannot provide pressure or force information.

In order to improve user experience of touch pad and provide users with richer functions, electronic device manufacturers are trying to increase third-dimensional touch information, that is, pressure information Z direction. Apple™ takes lead in launching MacBook Pro products with pressure detection, which may achieve pressure detection in a touch pad area and support pressure input recognition. According to their solution, four support points are added under a touch pad, and the support points are fixed on four cantilever beam structures, and four strain gauge sensors (also called strain sensors) are pasted to the four cantilever beam structures. When there is a touch operation, pressing force forces the four cantilever beam structures to undergo elastic deformation. The strain gauge sensors may detect an amount of deformation, and a force of the pressing force may be detected by analyzing the amount of deformation.

SUMMARY

Following is a summary of subject matter described in detail in the present disclosure. This summary is not intended to limit protection scope of claims.

The present application provides a method for detecting pressing force on a touch pad, an apparatus for detecting pressing force on a touch pad, and a storage medium, which provides a new idea for pressing force detection.

The method for detecting pressing force on a touch pad provided by the present application includes: detecting a pressing operation on the touch pad by an elastic wave sensor arranged under the touch pad to obtain a voltage signal; and, determining pressing force based on the voltage signal.

An apparatus for detecting pressing force on a touch pad provided by the present application includes a processing module, a touch pad, and an elastic wave sensor; the touch pad is configured to generate a pressing signal according to a pressing action; the elastic wave sensor is disposed on the touch pad and is configured to respectively convert the pressing signal into a corresponding voltage signal; and, the processing module is configured to determine pressing force according to the voltage signal.

The apparatus for detecting pressing force on a touch pad provided by the present application includes an elastic wave sensor and a processing module; the elastic wave sensor is arranged under the touch pad and is configured to generate a corresponding detection signal after the touch pad is pressed; the processing module includes: a conversion circuit connected to the elastic wave sensor and configured to convert the detection signal into a voltage signal; a calculation circuit connected to the conversion circuit and configured to perform following calculation according to the aforementioned method: determining pressing force based on the voltage signal.

The present application provides a computer readable and writable storage medium storing computer executable instructions, wherein when the computer executable instructions are executed by a processor, the steps of the aforementioned method for detecting pressing force on a touch pad are implemented.

The present application provides a computer device, which includes a memory, a processor, and a computer program stored in the memory and executable on the processor, and when the computer program is executed by the processor, the aforementioned method is implemented.

Other aspects will become apparent upon reading and understanding accompanying drawings and detailed description.

DETAILED DESCRIPTION

Figure 1:
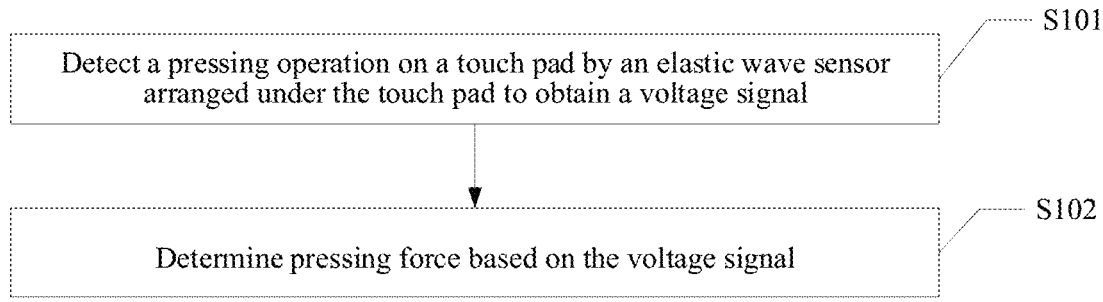
FIG. 1 is a flowchart of a method for detecting, pressing force on a touch pad provided by the present application.

The present application provides a method for detecting pressing force on a touch pad. As shown in FIG. 1, the method includes following steps.

In step S101, detecting a pressing operation on the touch panel by an elastic wave sensor arranged under the touch panel to obtain a voltage signal; wherein the pressing operation on the touch pad includes quick tapping, pressing down for a long time, sliding, and other operations.

The touch pad being pressed in the embodiment of the present application may also be referred to as the touch pad being touched.

In step S102, determining pressing force based on the voltage signal.

The number of elastic wave sensors in the embodiment of the present application may be single or multiple, and a specific number may be selected and used according to actual needs, which is not limited in the embodiments of the present application. The touch pad may be a touch panel such as a capacitive screen, a resistive screen, which is not limited in the embodiments of the present application. The elastic wave sensor of the present application includes any type of sensor that may detect a pressing operation to obtain a voltage signal. For example, it may be a piezoelectric sensor that captures an elastic wave generated by a pressing operation to obtain a corresponding voltage signal, or a strain sensor that deforms when pressing to obtain a corresponding voltage signal.

When the elastic wave sensor is a strain sensor, the strain sensor may be welded on a Printed Circuit Board (PCB) of a touch pad by a Surface Mounted Technology (SMT). Compared with a solution of pasting a strain sensor on a cantilever beam structure, space occupied is small, and an electronic device may be made smaller and lighter, which is consistent with an increasingly thin and light design trend of an electronic device. In addition, in the solution of pasting the strain sensor on the cantilever beam structure, in assembly, the strain sensor on the cantilever beam structure and its processing circuit need to be led out and connected to relevant circuits of the touch pad, and a pasting process needs to be adopted, which brings a great difficulty to production. However welding a strain sensor on a PCB of a touch pad may directly overcome this difficulty.

Figure 2:
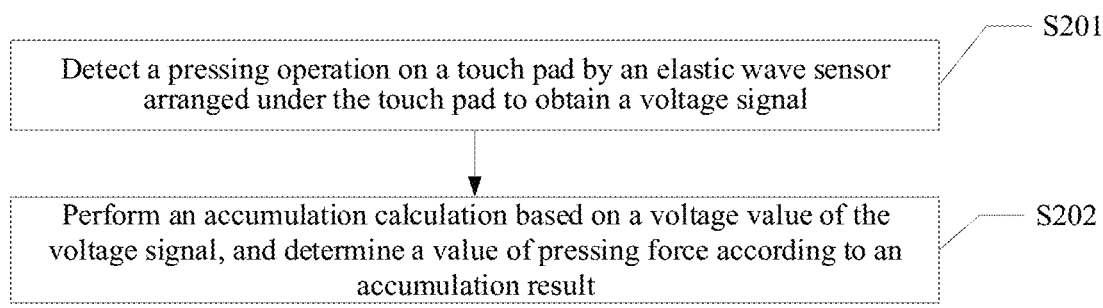
FIG. 2 is a flowchart of a method for detecting pressing force on a touch pad provided by an embodiment of the present application.

Based on the above method, an exemplary embodiment of the present application provides a method for detecting pressing force on a touch pad, as shown in FIG. 2, the method includes following steps.

In step S201, detecting a pressing operation on the touch pad by an elastic wave sensor arranged under the touch pad to obtain a voltage signal.

In step S202, performing an accumulation calculation based on a voltage value of the voltage signal and determining a value of pressing force according to an accumulation result.

In the present embodiment, pressing force is determined based on the voltage signal through step S202.

In an example, when there are multiple elastic wave sensors, the step of performing an accumulation calculation based on the voltage value of the voltage signal includes: performing an accumulation calculation based on a voltage value of a voltage signal detected by one of the elastic wave sensors; or, performing summation of voltage values of voltage signals at the same moment detected by some or all of the multiple elastic wave sensors, and performing an accumulation calculation based on the summed voltage values of the voltage signals. Voltage values of voltage signals detected by different elastic wave sensors may be assigned the same weight or different weights during the summation. For example, when voltage values of voltage signals from three elastic wave sensors are summed, a summed voltage value $V(t)=a*v1(t)+b*v2(t)+c*v3(t)$, where a, b, and c are weights, which may be the same as or different from each other, and a sum of a, b, and c may be equal to 1; $v1(t)$, $v2(t)$, and $v3(t)$ are voltage values of voltage signals from three different elastic wave sensors. That selecting some elastic wave sensors among the multiple elastic wave sensors to participate in calculation, is considering that if voltage signals detected from some elastic wave sensors away from contacts are lower than a preset threshold, they may not participate in an accumulation calculation. The accumulation calculation in the present application may be regarded as an integral calculation.

In an exemplary embodiment, the step of performing an accumulation calculation based on the voltage value of the voltage signal includes: sampling a voltage signal within a set duration to obtain a voltage value of a valid voltage signal; an actual situation of a voltage signal waveform needs to be considered for the set duration, so that the voltage value of the valid voltage signal can be obtained when sampling the voltage signal within the set duration; the set duration is 2 ms or 10 ms, or greater than 2 ms and less than 10 ms; subtracting a set reference value from the voltage value of the valid voltage signal to obtain a difference, accumulating a obtained difference or a difference correction value obtained by correcting the difference, and taking an absolute value to obtain an accumulation result; wherein, a current moment is taken as an end moment for the set duration; voltage signals sampled within the set duration are all valid voltage signals, or a voltage signal sampled within the set duration with a difference between a voltage value of the voltage signal and the reference value being within a predetermined range is a valid voltage signal.

The set reference value may be zero. When actually pressing a touch pad, force usually changes. Setting a reference value may better collect positive and negative changes of a voltage waveform, so that an accumulation result is more in line with an actual situation. The duration set in the present application may generally include voltage waveforms with positive and negative changes. For example, when pressing force becomes smaller, a voltage value is negative to reflect this change. In the present embodiment, after acquiring: a voltage value of a valid voltage signal by sampling a voltage signal within a set duration, multiple differences or difference correction values are obtained by calculating based on these voltage values. Each time these differences or difference correction values are accumulated, an absolute value of an accumulated sum is taken as an accumulation result for calculating a current output force. In a next accumulation, differences or difference correction values without taking an absolute value are still used for accumulation, and an absolute value is taken as an accumulation result after an accumulated sum is obtained.

In an exemplary embodiment, the difference correction value obtained by correcting the difference includes: taking an absolute value of the difference, carrying out a mathematical processing and retaining positivity and negativity of the difference as the difference correction value, wherein the mathematical processing includes an exponentiation calculation, such as a square or square root calculation. After taking the absolute value of the difference and carrying out the mathematical processing, a value of pressing force subsequently determined according to an accumulation result may meet a required law. For example, a linear relationship showing between a value of pressing force and a difference participating in an accumulated calculation may reduce amount of calculation for correction to a certain extent.

In an exemplary embodiment, the corrected difference includes: taking a difference obtained by subtracting a product of a previous difference and a set ratio from each difference as a difference correction value.

The set reference value includes a static reference value or a dynamic reference value generated according to a voltage value of a voltage signal within the set duration.

The static reference value refers to that reference values used in each calculation are the same. For example, when a touch pad is pressed continuously within a first set duration and multiple click actions are performed within a second set duration, the same reference value is used when voltage values of voltage signals within the first set duration and voltage values of voltage signals within the second set duration are respectively used for an accumulation calculation. The static reference value may be set as an intermediate value of a voltage range of the voltage signals. For example, when a voltage range is −1.5V to 1.5V, a reference value may be set to 0V, and when a voltage range is 0 to 3.3V, a reference value may be set to 1.65v. In an actual calculation, when sampling values of voltage signals are directly accumulated, the reference value is an intermediate value of a sampling value range corresponding to a voltage range. Setting a reference value to the intermediate value may make response ranges of positive and negative voltages symmetrical and better reflect changes in a force.

The dynamic reference value refers to that a reference value used in each calculation is related to a state of a current voltage signal, that is, the reference value used in each calculation is not necessarily the same.

A setting method of the dynamic reference value includes: when a voltage signal within the set duration is within a preset range, taking a result of averaging voltage values of the voltage signal within the set duration as a reference value within the set duration to achieve a purpose of eliminating a part of an interference noise: or taking a voltage value forming a moving average of a voltage signal within the set duration as a reference value within the set duration to achieve a purpose of reducing an accumulated linear error.

In actual circuits, a signal collection range of many voltages is 0 to 3.3V, that is, a negative voltage cannot be collected. In order to collect positive and negative changes of voltage waveforms in an embodiment of the present application, a reference value is set, a voltage value is positive when the voltage value is higher than the reference value, and a voltage value is negative when the voltage value is lower than the reference value, Because of positive and negative values of voltages, when voltage signals are accumulated and calculated, positive and negative voltage values may cancel each other out. For example, when a touch pad is clicked many times within a preset duration, since each click includes a process of exerting and releasing force on the touch pad, theoretically, every click will generate a positive voltage signal and a negative voltage signal with the same absolute value if a system is stable. When voltage signals within a preset duration are accumulated, the positive voltage signal and the negative voltage signal with the same absolute value will cancel each other out, and a finally obtained force value only reflects a force of a last press. When the system is not stable enough, according to a situation, when it is determined that there is no pressing behavior, historical data will be cleared and a force value Will be calculated again. Of course if a circuit structure can support a collected voltage to be a negative value, the reference value may be equal to 0.

The method for detecting pressing force on the touch pad described in the embodiment of the present application may be completed by a digital signal processing chip, and the voltage signals participating in the accumulation calculation may be sampled discrete signals.

In an exemplary embodiment, the step of determining a value of the pressing force according to the accumulation result includes: converting the accumulation result by using a conversion coefficient between the accumulation result (also referred to as a pressing force value of a voltage signal herein) and a force to determine the force of the pressing. The conversion coefficient between the pressing force value of the voltage signal and the force may be determined through a calibration process, for example, a touch pad is pressed with a limited number of known forces, and a pressing force value of a voltage signal corresponding to each known force is obtained according to the method described in the embodiment of the present application, and then the conversion coefficient between the pressing force value of the voltage signal and the force is calculated according to the limited number of known forces and the obtained pressing force value of the voltage signal corresponding to each known force.

In an exemplary embodiment, after converting the accumulation result by using the conversion coefficient between the pressing, force value of the voltage signal and the force to determine the value of the pressing force, the method further includes: correcting the determined value of the pressing force using a correction coefficient. The correction coefficient is added according to possible imbalance of different positions of a touch pad (this imbalance will make detected forces different when pressing at different positions of the touch pad with the same force), thereby making a rectified force more accurate.

In an exemplary embodiment, after determining the value of the pressing force, the method timber includes: triggering a first designated action, such as triggering a press action, when the value of the pressing force is greater than a first threshold; and triggering a second designated action, such as triggering a release action, when the value of the pressing force is less than a second threshold.

The second threshold is less than or equal to the first threshold, and the first threshold and the second threshold may be adjusted. For example, when an operation on a touch pad is faster, that is, a waveform of a voltage signal changes rapidly, a threshold may be adjusted higher or lower, and may be set according to an actual situation.

Based on the aforementioned method for detecting pressing force on a touch pad, specific application examples will be given below for further explanation. Those skilled in the art should understand that this explanation is only to help understand the method provided by the present application, and does not limit it in any way.

Assuming that T is a current moment (that is, an end moment of a set duration), and a data $V_T$ at moment T is a difference obtained by subtracting the set reference value from a pressing force value of a valid voltage signal, and a size of $V_T$ is a value represented by a length of a vertical line at a position of the moment T; $V_{T1}$, $V_{T2}$, and $V_{T3}$ are respectively differences obtained by subtracting a set reference value from a pressing force value of a valid voltage signal at moment T1, T2, and T3 selected by a set duration; z is a conversion coefficient between a pressing force value of a voltage signal and a force; and a set duration includes 4 sampling points, a pressing force value Force generated by pressing the touch pad at the moment T is as follows.

$$Force = z * |V_T + V_{T1} + V_{t2} + V_{T3}|$$

Figure 3:
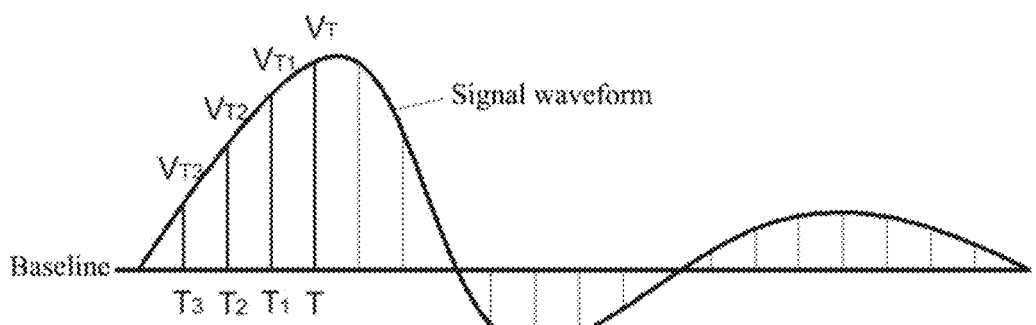
FIG. 3 is a schematic diagram of a method for calculating pressing force on a touch pad provided by an application example of the present application.
Figure 4:
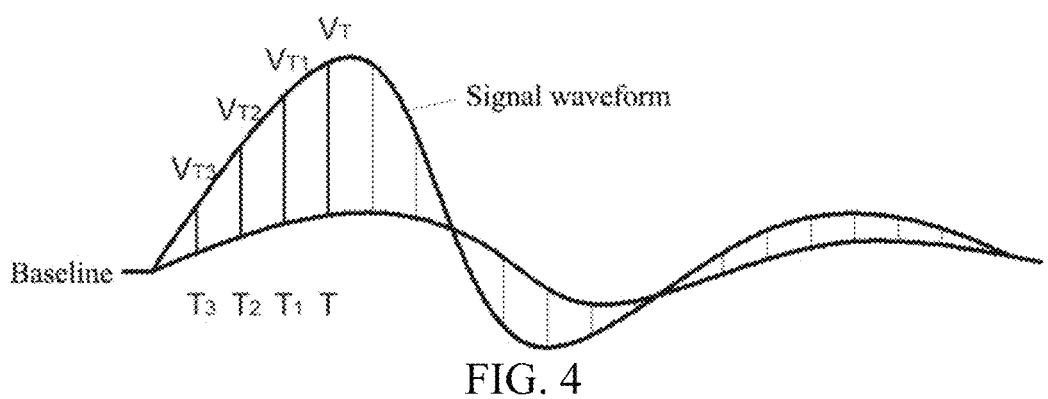
FIG. 4 is a schematic diagram of another method for calculating pressing force on a touch pad provided by an application example of the present application.

In an example, a reference value may be a static value as shown in FIG. 3. In another example, a reference value may be a dynamic value, for example, a value of a moving average of a voltage signal formed within a set duration (that is, a result of averaging voltage values of the voltage signal within the set duration) is taken as a reference value within the set duration, as shown in FIG. 4. In these two cases, values of $V_T$, $V_{T1}$, $V_{T2}$, and $V_{T3}$ are different.

In another example, taking a certain proportion of the voltage value at the previous moment as the reference value at the current moment, and still taking four sampling points as an example, a pressing force value Force generated by pressing the touch pad at the moment may be calculated according to following formula:

$Force = z * |(V_T - V_{T1} * k) + (V_{T1} - k * V_{T2}) + (V_{T2} - k * V_{T3})|$; is a set ratio, and meanings of other parameters are the same as those in the above example. The calculation method of a pressing force value Oven by this example may obtain an accurate pressing force value faster.

An embodiment of the present application further provides a computer readable and writable storage medium storing computer executable instructions, and when the computer executable instructions are executed by a processor, the steps of the aforementioned method of detecting pressing force on a touch pad are implemented.

Figure 5:
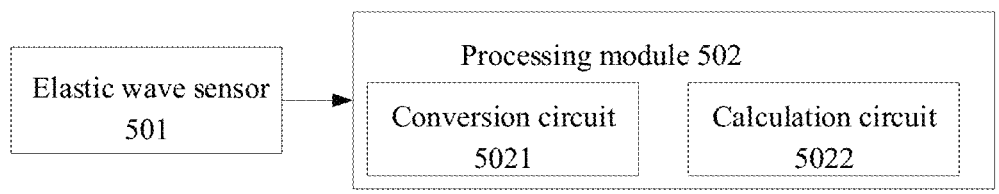
FIG. 5 is a diagram of a structure of an apparatus for detecting pressing force on a touch pad provided by, an embodiment of the present application.

The embodiment of the present application further provides an apparatus for detecting pressing force on a touch pad. As shown in FIG. 5, the apparatus includes an elastic wave sensor 501 and a processing module 502.

The elastic wave sensor 501 is arranged under the touch pad and is configured to generate a corresponding detection signal after the touch pad is pressed.

The elastic wave sensor 501 may include a piezoelectric sensor or a strain sensor, wherein a detection signal generated by the piezoelectric sensor is a charge signal and a detection signal generated by the strain sensor is a deformation signal.

The processing module 502 may be implemented by an intelligent chip, and includes: a conversion circuit 5021 connected to the elastic wave sensor 501 and configured to convert the detection signal into a voltage signal; the conversion circuit converts a charge signal generated by a piezoelectric sensor into a voltage signal, or convert a deformation signal generated by a strain sensor into a voltage signal through a corresponding conversion circuit; and a calculation circuit 5022 connected to the conversion circuit 5021 and configured to perform following calculation according to the aforementioned method: determining pressing force based on the voltage signal.

The number of elastic wave sensors 501 in the embodiment of the present application may be single or multiple. When there are multiple elastic wave sensors 501, the elastic wave sensors 501 may be respectively connected to the processing module 502 through signal lines. Or, at least two elastic wave sensors 501 of the multiple elastic wave sensors 501 are connected in series to the processing module 502 through signal lines.

In an exemplary embodiment of the present application, an elastic wave sensor adopts a strain sensor, which may adopt an installation method of a MacBook Pro product.

In an exemplary embodiment of the present application, an elastic wave sensor adopts a pressure sensor, and at least one of the elastic wave sensor 501 and the processing module 502 is arranged under a touch pad, which may be welded, pasted, clamped, screwed, and etc. A signal line connected between the elastic wave sensor 501 and the processing module 502 may be a trace on a touch pad, but is not limited here. In an example, the elastic wave sensor and the processing module are both welded on a touch pad by welding, and a signal line connected between them is also designed on the touch pad, thus effectively reducing assembly difficulty and reducing cost.

A solution of adopting a strain sensor requires that all pressing forces should be conducted to their respective cantilever beam structures through multiple support points, and a touch pad needs to be completely separated from other structures except the support points. The support points and the cantilever beam structures will occupy a large space, resulting in a larger electronic device and higher overall costs. In assembly, it is necessary to connect strain gauge sensors on the cantilever beam structures and their processing circuits to relevant circuits of the touch pad, and it is necessary to adopt a pasting process, which brings difficulties to production, in addition, the processing circuits are relatively complex and cost is high. A solution of adopting a pressure sensor requires small space, which may effectively reduce an assembly difficulty and cost, and a processing circuit is relatively simple.

Figure 6:
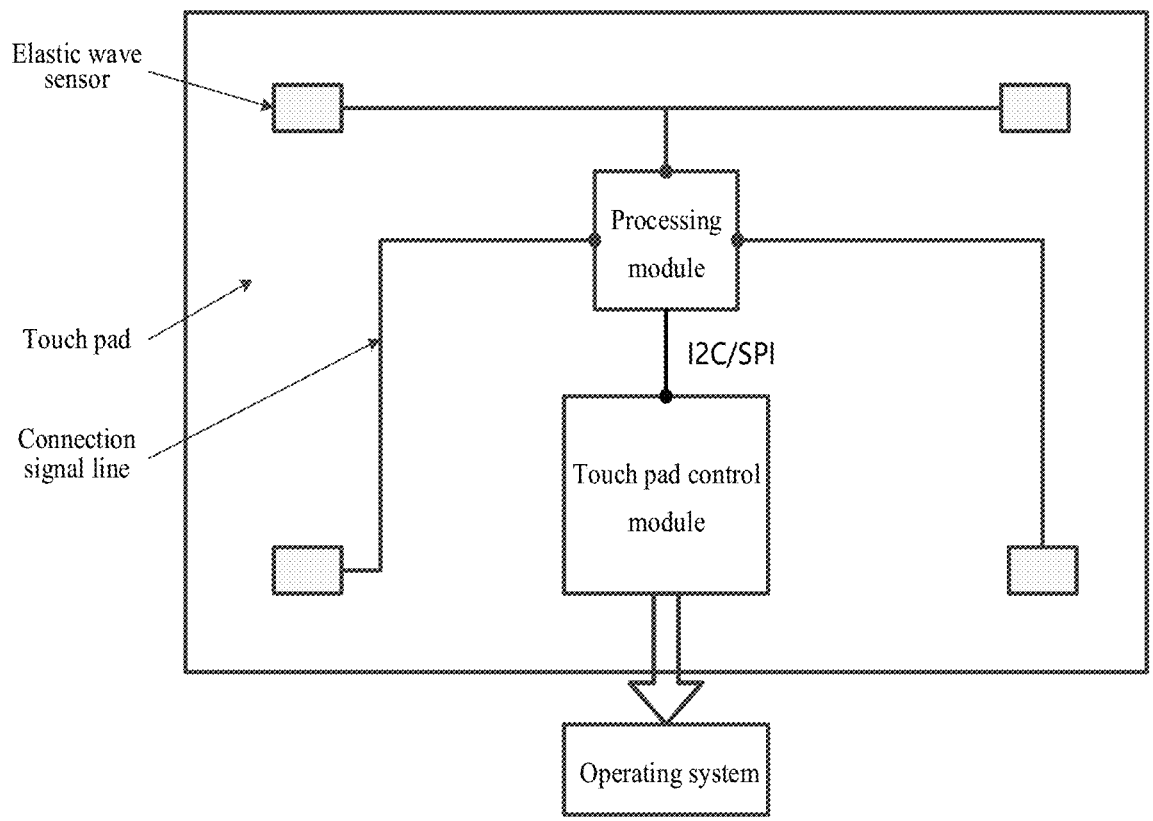
FIG. 6 is a diagram of a structure of another system for detecting pressing force on a touch pad provided by an embodiment of the present application.

An embodiment of the present application further provides a system for detecting pressing force on a touch pad, as shown in FIG. 6, which includes the apparatus for detecting pressing force on a touch pad shown in FIG. 5, and thriller includes a touch panel control module. After acquiring, an actual pressing force, the processing module transmits the pressing force to the touch pad control module through an interface (such as an 12C/SPI interface), and the touch pad control module integrates touch information (including a touch position a triggered action, etc.) and then reports to an operating system, which performs operations such as zooming, previewing, and selecting.

Figure 7:
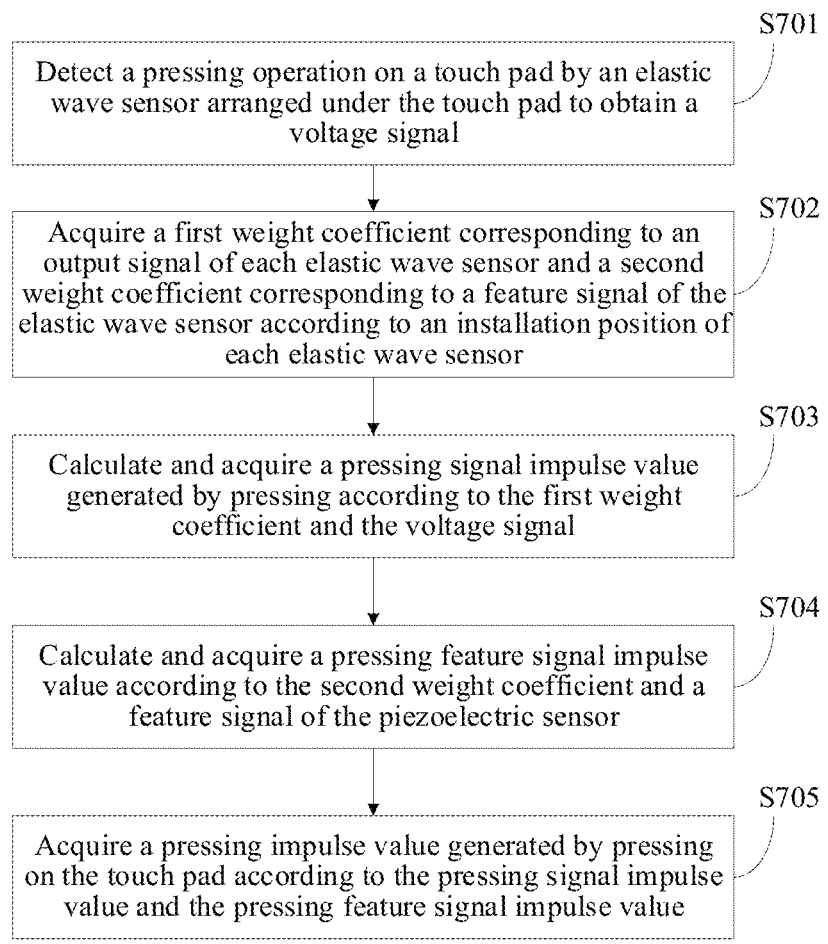
FIG. 7 is a flowchart of another method for detecting pressing force on a touch pad provided by an embodiment of the present application.

An exemplary embodiment of the present application further provides a method for detecting pressing force on a touch pad. In the present embodiment, detected pressing force is represented by pressing impulse. As shown in FIG. 7, the method includes following steps.

In S701, detecting a pressing operation on a touch pad by an elastic wave sensor arranged under the touch pad to obtain a voltage signal.

In S702, acquiring a first weight coefficient corresponding, to an output signal of each elastic wave sensor and a second weight coefficient corresponding to a feature signal of the elastic wave sensor according to an installation position of each elastic wave sensor.

In S703, calculating and acquiring a pressing signal impulse value generated by pressing according to the first weight coefficient and the voltage signal.

In S704, calculating and acquiring a pressing feature signal impulse value according to the second weight coefficient and the feature signal of the elastic wave sensor.

In S705, acquiring a pressing impulse value generated by pressing on the touch pad according to the pressing signal impulse value and the pressing feature signal impulse value.

In an exemplary embodiment, the elastic wave sensor is a piezoelectric sensor, and the step of detecting a pressing operation on a touch pad by an elastic wave sensor arranged under the touch pad and obtaining a voltage signal includes: acquiring pressing signals generated by finger pressing on a touch pad by at least two elastic wave sensors arranged under the touch pad, and respectively converting the pressing signals into corresponding voltage signals.

In an exemplary embodiment, the pressing signal may be an elastic wave signal; the number of the elastic wave sensors may be two, four, or other minters, and a specific number may be selected and used according to an actual need, which is not limited in the embodiments of the present application.

In an exemplary embodiment, the first weight coefficient may be determined by a difference between each elastic wave sensor and reference data, respectively obtained by a staff in a an early stage of testing, such as a ratio of an output value of each elastic wave sensor to the reference data under a condition of the same pressing force and different pressing positions. The first weight coefficient is determined according to the ratio, and then the first weight coefficient is used to calibrate the output value of each elastic wave sensor. The second weight coefficient may be obtained by determining a difference between an output value of each elastic wave sensor and an actual force through multiple experiments in an early stage. Of course, those skilled in the art should know that the first weight coefficient and the second weight coefficient may be obtained by other methods besides the above methods, such as a deep learning algorithm, and the present application is not limited here.

In the above embodiments, the touch pad may be a rigid medium, or an elastic wave propagation medium combined with a rigid medium, which is used to generate an elastic wave signal (a mechanical wave) when an external object (such as a finger, a stylus) presses the touch pad. After being captured by an elastic wave sensor such as a piezoelectric sensor module, the elastic wave signal is converted into a voltage signal with the same frequency as the elastic wave signal, thereby retaining an impulse feature of the elastic wave signal. Then, a weight value is respectively set according to an installation position of each elastic wave sensor, a pressing signal impulse value is obtained by using a product of the weight value and a voltage signal output by the elastic wave sensor, and the pressing signal impulse value represents a pressing feature for filtering noises on the touch pad. Then a pressing feature signal impulse value is calculated according to respectively acquired feature signals of each elastic wave sensor and their respective weight values. Finally, the pressing feature signal impulse value and the pressing signal impulse value are added to obtain a pressing impulse value generated by pressing on the touch pad. The touch pad may be a touch panel such as a capacitive screen and a resistive screen, and the present application is not limited here.

In order to improve accuracy of later data of force, the step of respectively converting pressing signals into corresponding voltage signals includes: converting the elastic wave signals into voltage signals with predetermined frequencies respectively, for example, according to frequencies of the elastic wave signals, converting the elastic wave signals collected by the elastic wave sensor into voltage signals with the same frequency or voltage signals with a predetermined ratio; subsequently, calculating and acquiring a pressing impulse represented by the elastic wave signals according to amplification or reduction of the frequencies of the voltage signals by corresponding multiples or ratios. In practical work, in order to improve a calculation efficiency of the method for detecting pressing force on the touch pad, when an elastic wave signal occurs, the method further includes: according to a current detection environment, intercepting a signal segment with a predetermined length in the elastic wave signal for a subsequent conversion processing. Specifically, waveform data with different lengths of an elastic wave signal may be intercepted according to an attenuation degree of an elastic wave in a current detection environment, propagation condition of a propagation medium, a type of pressing that may occur, etc., and then the waveform data is converted into a voltage signal with a corresponding frequency, and then pressing impulse information during a pressing action is calculated and obtained by using the voltage signal. Of course, in the step of converting the waveform data into a voltage signal with a corresponding frequency, the waveform data may be converted into a voltage signal with another frequency. Subsequently, after calculating the pressing impulse information according to the voltage signal, the pressing impulse information is matched with an actual force situation, and the pressing impulse information represents the actual force situation. In the present application, when the elastic wave signal is converted into a voltage signal, a conversion frequency is not further limited, and those skilled in the art may select to use it according to an actual need.

In an exemplary embodiment, after converting the pressing signals into voltage signals with predetermined frequencies respectively, one or more of filtering processing, amplification processing, rectification processing, switching processing, Fourier transforming processing, and wavelet transforming processing may be further performed on the voltage signals to obtain preprocessed voltage signals. In this way, unnecessary errors caused by irrelevant signal data to later calculation results may be further eliminated, and the above signal processing flow will not be repeatedly introduced here. Then, on a basis of the preprocessed voltage signal, a pressing feature for filtering noises on the touch pad, namely a pressing signal impulse value, is calculated.

In an embodiment of the present application, calculating and acquiring the pressing signal impulse value generated by pressing according to the first weight coefficient and the voltage signal in the step S703 includes: calculating a Root Mean Square (RMS) value of an output waveform of each elastic wave sensor according to a voltage signal output by each elastic wave sensor; acquiring a signal impulse value output by each elastic wave sensor according to the Root Mean Square (RMS) value of the output waveform of each elastic wave sensor and the first weight coefficient; and, calculating (such as accumulating) and acquiring a pressing signal impulse value generated by pressing according to the signal impulse value output by each elastic wave sensor. In the embodiment, an interference noise when pressing occurs on the touch pad is mainly removed by calculating the RMS value of the output waveform of each elastic wave sensor. A calculation method of the RMS value will be described in detail later and not here. Of course, in actual work, those skilled in the art may filter out a noise by other means, which is not limited in the present application.

In an embodiment of the present application, calculating and acquiring a pressing feature signal impulse value according to the second weight coefficient and the feature signal of the elastic wave sensor in step S704 includes: acquiring a feature signal impulse value of each elastic wave sensor according to an amplitude of a feature signal of each elastic wave sensor and the second weight coefficient: calculating and acquiring a pressing feature signal impulse value according to the feature signal impulse value of the elastic wave sensor, in the embodiment, it is mainly to calculate an amplitude of a dominant frequency signal of each elastic wave sensor. However, due to detection errors caused by differences in installation positions of various elastic wave sensor and differences in structures of electronic devices using the method for detecting pressing force on the touch pad, the second weight coefficient is adopted in the embodiment to constrain again the amplitude of the feature signal output by each elastic wave sensor. Then, amplitudes of various constrained feature signal are summed obtain an amplitude of a voltage feature signal, so as to obtain the pressing feature signal impulse value of output signals of elastic wave sensors. At this time, the pressing signal impulse value and the pressing feature signal impulse value ma be weighted and summed to obtain a pressing impulse value generated by pressing on an actual touch pad.

Figure 8:
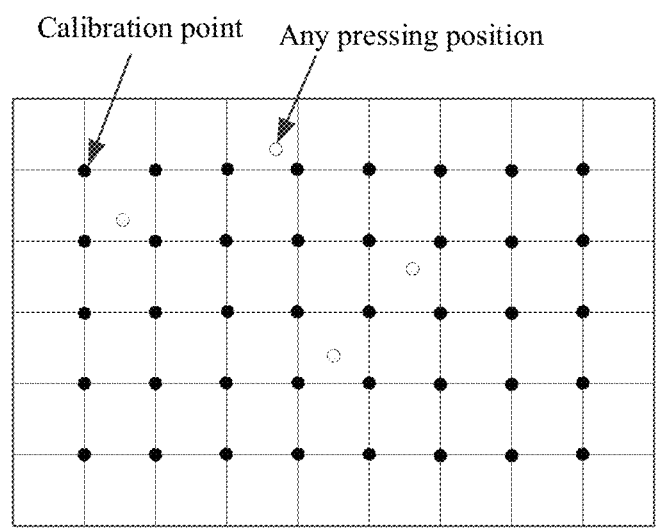
FIG. 8 is a schematic diagram of block calibration of a method for detecting pressing force on a touch pad provided by an embodiment of the present application.

In view of differences in structures of touch pads and differences m mounting modes on different electronic devices, there may be errors in the method for detecting pressing force on a touch pad under the same pressing force at different pressing positions on the touch pad. In order to reduce the errors, as shown in FIG. 8, in an embodiment of the present application, the method further includes: acquiring a pressing position of a pressing signal generated by finger pressing on the touch pad; acquiring a corresponding correction coefficient according to the pressing position; and, correcting the pressing impulse value according to the correction coefficient. The step of acquiring a corresponding correction coefficient according to the pressing position includes: calibrating multiple calibration points on the touch pad by a chessboard calibration method; respectively acquiring pressing impulse values of the calibration points under the same pressing pressure condition; comparing a pressing impulse value of each calibration point with a standard pressing impulse value to obtain a correction coefficient of each calibration point; and, acquiring a correction coefficient corresponding to the pressing position according to a positional relationship between the pressing position and each calibration point and the correction coefficient of each calibration point. The step of acquiring the correction coefficient corresponding to the pressing position according to the positional relationship between the pressing position and each calibration point includes: acquiring the correction coefficient corresponding to the pressing position by bilinear interpolation according to the positional relationship between the pressing, position and each calibration point and the correction coefficient of each calibration point. In the embodiment, an error is mainly reduced by detecting a pressing position when pressing occurs. The pressing position may be obtained by detecting a touch screen or by using elastic wave signals detected by the elastic wave sensors, which will not be described in detail in the present application.

Based on the aforementioned method for detecting pressing force on a touch pad, the following will take an actual electronic device using this method as an application example for further explanation. Those skilled in the art should understand that this explanation is only to help understand the method provided by the present application, and does not limit it in any way.

Figure 9:
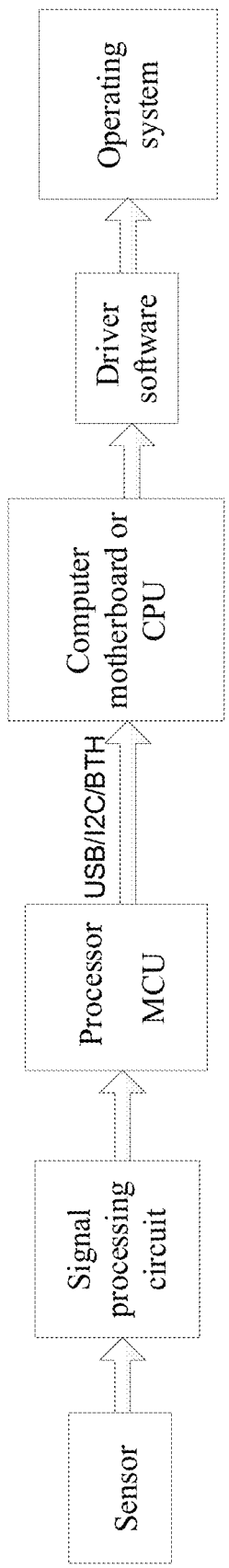
FIG. 9 is a schematic diagram of steps of using a method for detecting pressing force on a touch pad provided by an application example of the present application.

As shown in FIG. 9, when the method for detecting pressing force on a touch pad provided by the embodiment of the present application is applied to an electronic device, a linger pressing signal (such as an electric charge signal) is mainly collected by a piezoelectric sensor. Then processing of conversion, filtering, amplification, and etc. of the finger pressing signal to a voltage signal are performed by a signal processing circuit and then sent a processed signal to a processor MCU. The processor MCU undergoes a dedicated pressing force detection algorithm for a calculation processing, packages a calculation result into HID frames, and uploads the HID frames to a laptop motherboard or a CPU through I2C, USB, or BTU communication interfaces. Finally, pressing force information of the touch pad and existing position information of the touch pad are fused through an upper driver software of a laptop computer, packaged into HID frames containing both position information and force information, and then transmitted to an operating system. The dedicated pressing force detection algorithm is a force detection method of RMS combined with FFT.

The force detection method of RMS combined with FFT mainly performs level recognition of a pressing impulse by counting an RMS value of a signal of a sensor and amplitude information of an output waveform. Assuming that a coordinate point of a pressing position is loc0, two or four piezoelectric sensors are taken as examples. Firstly, an RMS value of an output waveform of each piezoelectric sensor is calculated as follows, $$\text{rms}_j = \sqrt{\frac{1}{N}\sum_{i=1}^{N} s_i^2} \quad (1)$$

In the formula, N is the number of all sampling points in one sampling; s is a sampling: sequence; i–1, ..., N, which is a serial number of the sampling points; j=1, ..., K (K=2 or 4) is a sensor channel number.

Then, according to an installation position of each sensor on the touch pad, a weight is assigned to an output signal of each sensor, and then an RMS summation of signals of sensor's on all channels is performed as follows.

$$f_{rms} = \sum_{i=1}^{K} \alpha_i \text{rms}_i \quad (2)$$

$$\sum_{i=1}^{K} \alpha_i = 1 \qquad (3)$$

In the formula, K=2 or 4; $\alpha_1$ is a weight coefficient of a sensor on the i-th channel.

An amplitude of a main frequency signal of an output signal of a sensor on each channel is calculated as follows, $$A_1 = f_{ppy}(s) \qquad (4)$$

In the formula, s is a sampling sequence, i=1, ..., K (K×2 or 4).

According to an installation position of a sensor, a weight β is assigned to the amplitude of the main frequency signal output by each sensor, and then a weighted summation of the amplitude of the main frequency signal output by each sensor is performed as follows.

$$f_A = \sum_{i=1}^{K} \beta_i A_i \qquad (5)$$

$$\sum_{i=1}^{K} \beta_i = 1 \qquad (6)$$

In the formula, K=2 or 4: $\beta_1$ is a weight coefficient of an amplitude of a main frequency signal output by a sensor on the i-th channel, and $A_1$ is the amplitude of the main frequency signal output by the sensor on the i-th channel.

To sum up, it may be obtained that a coordinate of a position of a pressing point is loc0, and a calculation function of a pressing impulse value is as follows.

$$Q = \gamma_0 f_{rms} + \lambda_0 f_A \qquad (7)$$

In the formula, $\gamma_0$ is a weight coefficient of a value of an RMS sum of channel signals of all sensors; and $\lambda_0$ is a weight coefficient of a value of a weighted sum of amplitudes of main frequency signals of channel signals of all sensors.

Therefore, a pressing impulse value generated by pressing on an actual touch pad may be acquired according to the Q. Due to influence of a form of an installation structure of a touch pad, there may be differences existed in parameters of a calculation function of pressing impulse obtained according to the above method under the same pressing force at different pressing positions. In order to accurately obtain parameters of a calculation function of force at any one pressing position, a touch pad is divided into blocks in the present application, as shown in FIG. 8. For each calibration point in FIG. 8 (a position shown by a solid circle in the figure), a set of parameters of a calculation function of force may be obtained through a calibration experiment: and for another arbitrary pressing point, parameters of a calculation function of force may be obtained by bilinear interpolation.

Figure 10:
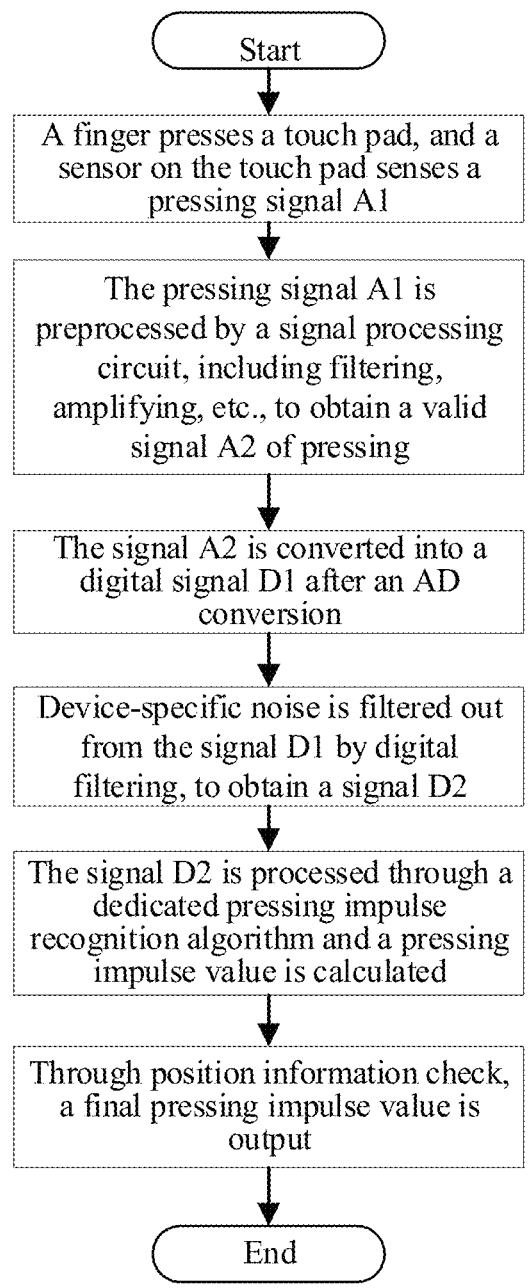
FIG. 10 is a schematic flowchart of a method for detecting pressing force on a touch pad provided by an application example of the present application.

Overall, an application principle of a pressing force detection and recognition method of the touch pad is shown in FIG. 10. Firstly, an elastic wave sensor on the touch pad will sense a pressing signal A1 when a linger presses the touch pad, the pressing signal will is preprocessed by a signal processing circuit, including filtering, amplification, and other processes, to obtain a pressing valid signal A2, A2 is converted into a digital signal D1 after an analog-to-digital conversion. The digital signal D1 is digitally filtered again to filter out a device-specific noise so as to acquire a relatively pure sampling signal D2. The digital signal D2 is processed through a dedicated pressing impulse recognition algorithm and a pressing impulse value is calculated. The pressing impulse value is processed through position information check, thereby a final pressing impulse value is output.

Therefore, to sum up, in the embodiment of the present application, an invalid interference noise may be eliminated by combining the provided RMS with FTT calculation, a pressing impulse value may be accurately obtained, and detection of force information of finger pressing on a touch pad may be performed on a basis of a relatively simple structure.

Figure 11:
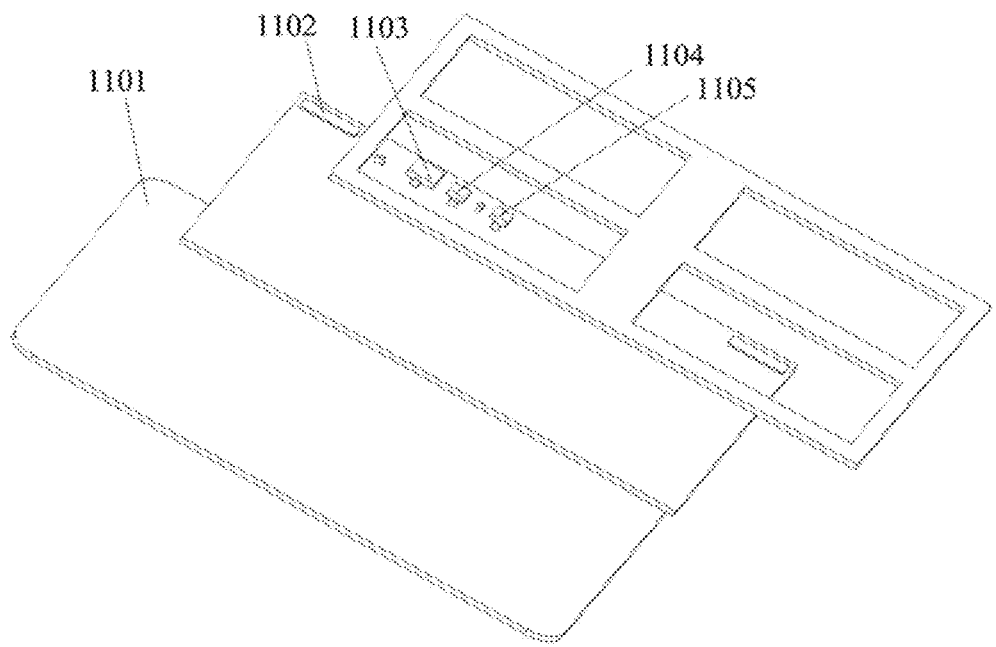
FIG. 11 is a diagram of a structure of another apparatus for detecting pressing force on a touch pad provided by an embodiment of the present application.

Referring to FIG. 11, an apparatus for detecting pressing force on a touch pad is further provided in an embodiment of the present application, and the apparatus includes a processing module 1103, a touch pad 1101, and an elastic wave sensor 1102. The touch pad 1101 is configured to generate a pressing signal according to a pressing action; the elastic wave sensor 1102 is disposed on the touch pad 1101 and is configured to respectively convert pressing signals into corresponding voltage signals; and, the processing module 1103 is configured to determine pressing, force according to the voltage signals, and the pressing force may be represented by pressing impulse.

The elastic wave sensor in the embodiment of the present application may be a piezoelectric sensor, and the number of the elastic wave sensors may be at least two. The apparatus may further includes a weight module 1105 and a calculation module 1104; the weight module 1105 is configured to acquire a first weight coefficient corresponding to an output signal of each elastic wave sensor 1102 and a second weight coefficient corresponding to a feature signal of the elastic wave sensor 1102 according to an installation position of each elastic wave sensor 1102; the calculation module 1104 is respectively connected to the elastic wave sensor 1102 and the weight module 1105, and is configured to calculate and acquire a pressing signal impulse value generated by pressing according: to the first weight coefficient and the voltage signals, and calculate and acquire a pressing feature signal impulse value according to the second weight coefficient and a feature signal of the elastic wave sensor 1102; and, the processing module 1103 is connected to the calculation module 1104 and is configured to acquire a pressing impulse value generated by pressing on the touch pad according to the pressing signal impulse value and the pressing feature signal impulse value. When the elastic wave sensor 1102 is a piezoelectric sensor, the piezoelectric sensor includes a piezoelectric, ceramic sensor, a piezoelectric thin film sensor, a piezoelectric crystal sensor, or another sensor with a piezoelectric effect.

In the above embodiment, the weight module 1105, the calculation module 1104, and the processing module 1103 may be integrated in a processing chip MCU, or may be disposed separately. A specific installation and arrangement form is not limited in the present application. In addition, in order to improve accuracy of subsequent pressing impulse detection, the apparatus further includes a preprocessing circuit, which is disposed between the elastic wave sensor and the calculation module, and is configured to perform one or more of filtering processing, amplification processing, rectification processing, switching processing, Fourier transforming processing, and wavelet transforming processing on the voltage signals to obtain preprocessed voltage signals. Since these, preprocessing circuits are common circuits, the present application will not explain them one by one here. In order to save costs in practical work, the apparatus for detecting pressing force on a touch pad may directly use a preprocessing circuit of an electronic device to perform the above preprocessing on voltage signals, or it may independently use a circuit with a corresponding function to perform the above preprocessing on voltage signals.

To sum up, the apparatus for detecting pressing force on a touch pad provided in the present application may be generally composed of three parts in practical user processor MCU, a signal processing circuit, and an elastic wave sensor. As shown in FIG. 11, in which two piezoelectric sensors are taken as an example, and the piezoelectric sensors are directly welded on a PCB printed board mounted on a back of a front panel of a touch pad. The processor MCU and the signal processing circuit are welded and integrated on the PCR This solution does not change an original installation structure of a touch pad, and only needs to mount the piezoelectric sensors on an original PCB and to add a corresponding processing circuit, thereby detection of pressing force on a touch pad may be implemented.

In an embodiment of the present application, the calculation module may include a difference calculation unit and an eigenvalue calculation unit. The difference calculation unit is configured to, calculate a Root Mean Square value of an output waveform of each elastic wave sensor according to a voltage signal output by each elastic wave sensor; acquire an amplitude of a signal output by each elastic wave sensor according to the root mean square value of the output waveform of each elastic wave sensor and the first weight coefficient; and calculate and acquire a pressing signal impulse value generated by pressing according to the amplitude of the signal output by the each elastic wave sensor. The eigenvalue calculation unit is configured to: acquire a feature signal impulse value of each elastic wave sensor according to the amplitude of the feature signal of each elastic wave sensor and the second weight coefficient, and calculate and acquire a pressing feature signal impulse value according to the feature signal impulse value of each elastic wave sensor. Specific implementation methods of the difference calculation unit and the eigenvalue calculation unit have been described in detail above, and will not be described one by one here.

In an embodiment of the present application, the apparatus may further include a position acquisition module and a calibration module. The position acquisition module is configured to acquire a pressing position of a pressing signal generated by finger pressing on the touch pad; and, the calibration module is configured to acquire a corresponding correction coefficient according to the pressing position, and correct the pressing impulse value according to the correction coefficient. The position acquisition module may be a touch screen of an electronic device, such as a capacitive screen, a resistance screen, and another recognition device. The position acquisition module may be integrated in the calculation module to calculate and acquire a pressing position of a pressing signal generated by finger pressing on a touch pad by using a position of each elastic wave sensor and reception time of an elastic wave signal specific structures and methods of use may be selected and configured according to an actual situation, and the present application is not limited here.

In an embodiment of the present application, the calibration module may further includes a calibration unit configured to calibrate multiple calibration points on the touch pad through a chessboard calibration method, respectively acquire pressing impulse values of the calibration points under the same pressing pressure condition, compare a pressing impulse value of each calibration point; with a standard pressing impulse value to obtain a correction coefficient of each calibration point. The calibration module is configured to acquire a correction coefficient corresponding to a pressing position based on a positional relationship between the pressing position and each calibration point and the correction coefficient of each calibration point. The calibration unit may be configured to acquire the correction Coefficient corresponding to the pressing position by bilinear interpolation based on the positional relationship between the pressing position and each calibration point and the correction coefficient of each calibration point.

An embodiment of the present application further provides a computer device, which includes a memory, a processor, and a computer program stored in the memory and executable on the processor, and the aforementioned method is implemented when the computer program is executed by the processor.

An embodiment of the present application further provides a computer readable storage medium, which stores the computer program for implementing the above method.

According to the method and apparatus for detecting pressing force on a touch pad provided by the embodiments of the present application, detection of force information of finger pressing on a touch pad may be implemented on a basis of reducing hardware costs, thereby not only making a structure simpler, fighter in weight, but also saving electricity.

Figure 12:
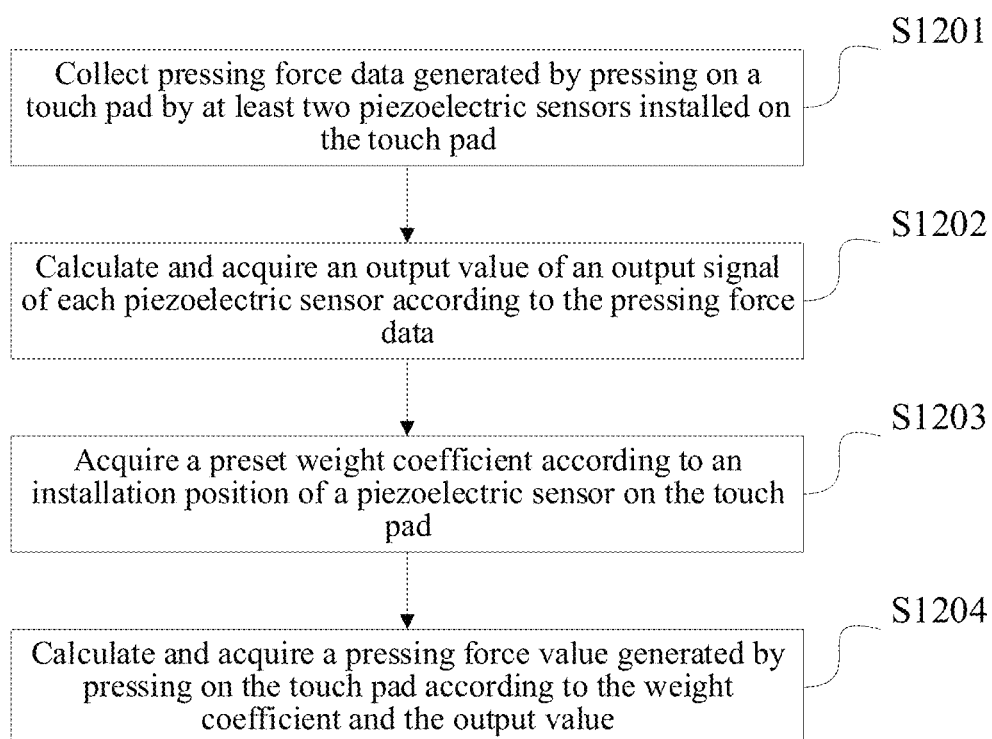
FIG. 12 is a schematic flowchart of another method for detecting pressing force on a touch pad provided by an embodiment of the present application.

An exemplary embodiment of the present application further provides a method for detecting pressing force on a touch pad, in the present embodiment, pressing force is represented by a pressing force value generated by pressing, as shown in FIG. 12, and the method includes following steps.

In S120 collecting pressing force data generated by pressing on a touch pad by at least two piezoelectric sensors disposed on the touch pad.

In S1202, calculating and acquiring an output value of a signal output by each piezoelectric sensor according to the pressing force data.

In S1203, acquiring a preset weight coefficient according to an installation position of the piezoelectric sensor on the touch pad.

In S1204, calculating and acquiring a pressing three value generated by pressing on the touch pad according to the weight coefficient and the output value.

In the above embodiments, the pressing signal may be an elastic wave signal. The number of the piezoelectric sensors may be two or four, or three or more than five, and a specific number may be selected and used according to an actual need, and the present application is not limited here. The touch pad may be a rigid medium, or an elastic wave propagation medium combined with a rigid medium, which is used to generate an elastic wave signal when an external object (such as a finger, a stylus) presses the touch pad. After being captured by a sensor such as a piezoelectric sensor module, the elastic wave signal is convened into a voltage signal with the same frequency as the elastic wave signal, thereby retaining a force feature of the elastic wave signal. Then, a weight value is set respectively according to an installation position of each piezoelectric sensor, and a pressing force value of the pressing signal is obtained by using a product of the weight value and the voltage signal output by the piezoelectric sensor, and the pressing force value of the pressing signal represents a pressing feature for filtering noises on the touch pad. The touch pad may be a touch panel such as a capacitive screen, a resistive screen, and the present application is not limited here.

In order to improve accuracy of collected pressing force data, in an embodiment of the present application, the above step S1202 includes: according to the pressing force data, calculating and acquiring an integral value of an output signal of each frame of each piezoelectric sensor at a predetermined frame rate after bias is eliminated from the output signal of each frame; and calculating and acquiring an output value of each piezoelectric sensor according to the integral value of each piezoelectric sensor at a predetermined frame rate. When there are two or four piezoelectric sensors, the collected pressing force data is uploaded according to a predetermined frame rate after the touch pad detects touch information. An integral value of an output signal of each piezoelectric sensor after bias is eliminated from the output signal of each piezoelectric sensor is calculated according to the pressing force data, and a specific formula is as follows.

$$g_j(k) = \sum_{i=1}^{N}(s_{ij}(k) = \hat{s}_j); \qquad (8)$$

In the above formula, $g_j(k)$ is an integral value of an output signal of the j-th (j=1, 2, ..., M) sensor after bias is eliminated front the output signal, in the k-th (k=1, 2, ..., K) sampling period; M=2 or 4, which is the number of sensors on the touch pad; $s_{ij}(k)$ is the i-th (i=1, 2, ..., N) sampling value of the j-th sensor in the k-th sampling period; N is the number of sampling points in a sampling period, and $\hat{s}_j$ is bias value of an output signal of a sensor on the j-th channel.

Then, based on the integral value of each frame, an accumulated value of an output signal of each piezoelectric sensor, that is, an output value is calculated as follows.

$$G_j(k)=G_j(k-1)+g_j(k); \qquad (9)$$

In the above formula, $G_j(k)$ is an accumulated value of an output signal of the j-th sensor in the k-th sampling period.

In actual work, in view of difference in structures of touch pads and differences in mounting modes on different electronic devices, there may be errors existed in the method for detecting pressing force on a touch pad under the same pressing force at different pressing positions on the touch pads. In order to reduce the errors, in an embodiment of the present application, the method further includes: assigning a weight to an output signal of each sensor according to an installation position of each sensor on the touch pad, and then summing up accumulated values of output signals of all piezoelectric sensors to obtain a pressing force value of actual pressing, and a specific formula is as follows.

$$f(k) = \sum_{j=1}^{M}\alpha_j|G_j(k)| \qquad (10)$$

$$\sum_{j=1}^{K}\alpha_j = 1 \qquad (11)$$

In the above formula, f(k) is an accumulated value of signals of sensors on all channels in the k-th sampling, period; and $\alpha_j$ is a weight coefficient of a sensor on the j-th channel.

Due to an influence of an installation structure of a touch pad, there are differences in parameters of a calculation function of force obtained according to the above method under the same pressing force at different pressing positions. Therefore, in an embodiment of the present application, the above step S1204 includes: acquiring a pressing position of pressing, force data generated on the touch pad: acquiring a pre-stored correction coefficient corresponding to the pressing position based on the pressing position; acquiring a pressing force value generated by pressing on the touch pad according to the correction coefficient, the weight coefficient, and the output value. Therefore, the calculation result is corrected based on a position of a pressing point. Assuming that a correction coefficient is β, a value of pressing force of each coordinate position point of the touch pad is as follows.

$$I_{(x,y)}(k)=\beta_{(x,y)}f_{(x,y)}(k); \qquad (12)$$

In the above formula, $I_{(x, y)}(k)$ is a value of pressing force at a coordinate (x, y) in the k-th sampling period; $\beta_{(x, y)}$ is a correction coefficient of pressing force at the coordinate (x, y); and, $f_{(x,y)}(k)$ is an accumulated value of signals of sensors on all channels at the coordinate (x, y) in the k-th sampling period.

In the above embodiment, in order to obtain a correction coefficient of pressing force at any one pressing position, calibration need to be performed in advance, a method is as follows: performing block calibration on the touch pad, calculating, and acquiring a correction coefficient of each pressing position on the touch pad by bilinear interpolation, and storing the correction coefficient: after associating the correction coefficient with a corresponding pressing position. Referring to FIG. 8, for each calibration point in FIG. 8 (a position shown by a black dot in the figure), a set: of correction coefficients of pressing force may be obtained through a calibration experiment; and for another arbitrary pressing position, a correction coefficient of pressing force may be obtained by bilinear interpolation. In the present embodiment, an error is mainly further reduced by detecting a pressing position when pressing occurs. The pressing position may be obtained by detection of a touch screen or by using an elastic wave signal detected by the piezoelectric sensor, and the present application will not describe in detail here.

When a touch pad receives press information, the press information may be not a real input intention of a user, such as a unconscious touch. In order to avoid unnecessary data calculation and signal output caused by these conditions, in an embodiment of the present application, the above step S1202 may further include: comparing the pressing force data with a predetermined threshold; calculating and acquiring an output value of an output signal of each piezoelectric sensor according to the pressing force data when the pressing force data is greater than the predetermined threshold; clearing the pressing force data collected by the piezoelectric sensor when the pressing force data is less than or equal to the predetermined threshold. When a touch pad receives touch information and a value of pressing force exceeds a trigger threshold of a pressing action, it is recognized as a pressing action, and its mathematical expression is as follows.

$$\text{button\_state} = \begin{cases} 1, I \geq I_{TH} \\ 0, I < I_{TH} \end{cases} \qquad (13)$$

When a value of pressing force in a current sampling period is lower than a trigger threshold, a pressing action ends and an accumulated value of signals of sensors on all channels is cleared. Of course, in order to improve accuracy of data, when the piezoelectric sensor outputs a signal, one or more of filtering processing, amplification processing, rectification processing, switching processing, Fourier transforming processing, and wavelet transforming processing may be performed on the voltage signal, so as to obtain an output value with less interference. Unnecessary errors caused by irrelevant signal data to later calculation results may be eliminated, and as for the above signal processing flow, the present application will not describe in detail here.

Based on the aforementioned method for detecting pressing force on a touch pad, the following will take an actual electronic device using the method as an application example for further explanation. Those skilled in the art should understand that this explanation is only to help understand the method provided by the present application, and does not limit it in any way.

Figure 13:
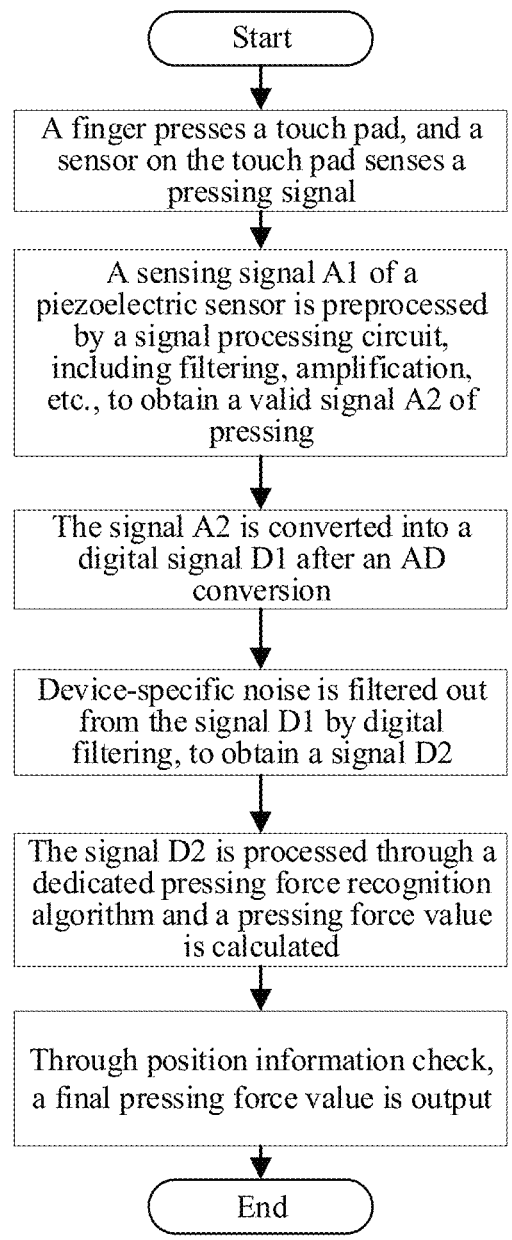
FIG. 13 is a schematic flowchart of a method for detecting pressing force on a touch pad provided by an application example of the present application.

Referring to FIG. 9, when applying the method for detecting pressing force on a touch pad provided by the present application to an existing electronic device, a pressing signal is mainly collected by a piezoelectric sensor. Then a conversion processing, a filtering processing, and an amplification processing of a finger pressing signal to a voltage signal are performed by a signal processing circuit, and then a processed result is sent to a processor MCU. The processor MCU undergoes a dedicated pressing force detection algorithm for a calculation processing, packages the calculation result into HID frames, and uploads the HID flames to a laptop motherboard or a CPU through I2C, USB, or BTH communication interfaces. Finally, pressing force information of the touch pad and existing position information of the touch pad are fused by an upper driver software of a laptop computer packaged into an HID frame containing both position information and force information, and then transmitted to an operating system. The dedicated pressing force detection algorithm is the method for detecting pressing three on the touch pad. Overall, an application principle of the method for detecting pressing force on the touch pad is shown in FIG. 13. Firstly, when a linger presses a touch pad, a piezoelectric sensor on the touch pad will sense a pressing signal A1, the pressing signal A1 is preprocessed by a signal processing circuit, including filtering, amplification and other processes to obtain a pressing valid signal A2, A2 is converted into a digital signal D1 after an analog-to-digital conversion. The digital signal D1 is digitally filtered again to filter out a device-specific noise so as to acquire a relatively pure sampling signal D2. The digital signal D2 is processed through a dedicated pressing force detection algorithm and a value of pressing force is calculated. The value of pressing force is further processed through position information check, thereby a final value of pressing force is output.

Figure 14A:
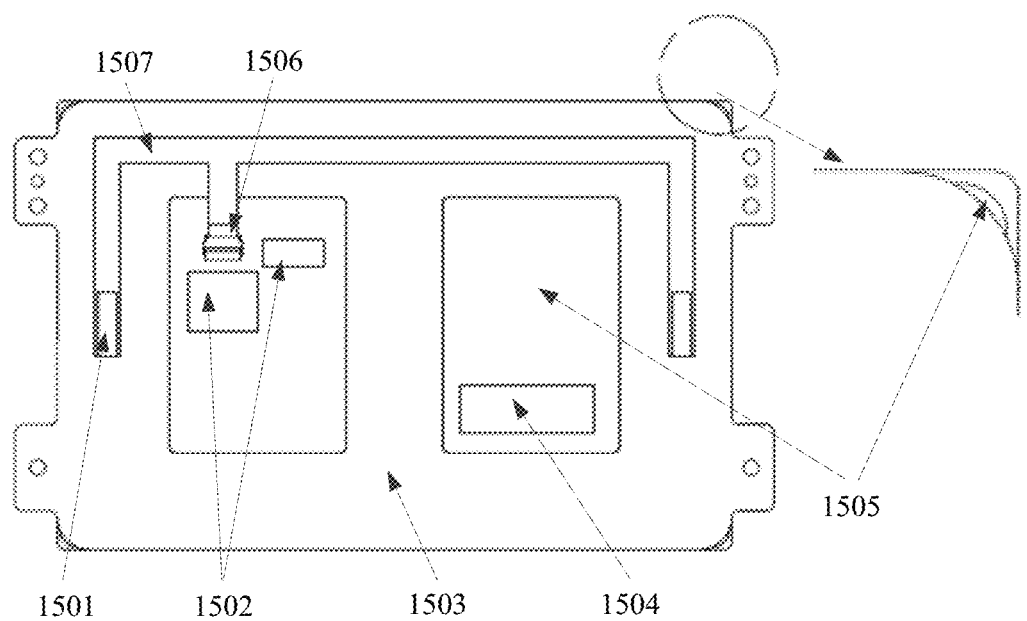
FIGS. 14A to 14B are schematic diagrams of a structure of an apparatus for detecting pressing force on a touch pad provided by an embodiment of the present application.
Figure 14B:
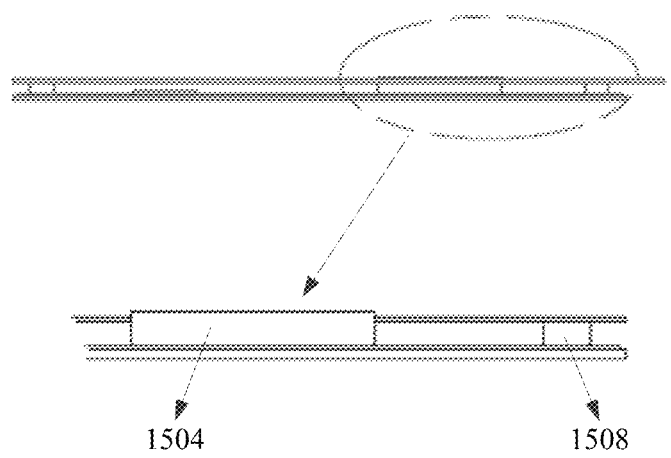

Referring to FIGS. 14A to 14B, the present application further provides an apparatus for detecting pressing force on a touch pad, which includes a touch pad, a force calculation module, a weight module, a calculation module, and at least two piezoelectric sensors. The piezoelectric sensors are disposed on the touch pad and are configured to collect pressing force data generated by pressing on the touch pad; the force calculation module is connected to the piezoelectric sensors and is configured to calculate and acquire an output value of a signal output by each piezoelectric sensor according to the pressing force data. The weight module is configured to acquire a preset weight coefficient according to installation positions of the piezoelectric sensors on the touch pact and, the calculation module is respectively connected to the weight module and the force calculation module, and is configured to calculate and acquire a pressing force value generated by pressing on the touch pad according to the weight coefficient and the output value. The piezoelectric sensors include piezoelectric ceramic sensors, piezoelectric thin film sensors, piezoelectric crystal sensors, or other sensors with a piezoelectric effect. In the above embodiments, the weight module, the calculation module, and the force calculation module may be integrated into a processing chip MCU as shown in the figure, or they may be disposed separately. A specific installation arrangement is not limited in the present application.

In an embodiment of the present application, the force calculation module includes an integration unit and an accumulation unit. The integration unit is configured to calculate and acquire an integral value of an output signal of each frame of each piezoelectric sensor at a predetermined frame rate after bias is eliminated from the output signal of each frame, according to the pressing force data, and the accumulation unit is configured to calculate and acquire an output value of each piezoelectric sensor according to the integral value of each piezoelectric sensor at a predetermined frame rate. The calculation module further includes a position acquisition unit, a processing unit, and a calculation unit. The position acquisition module is configured to acquire a pressing position of pressing force data generated on the touch pad; the processing unit is configured to acquire a pre-stored correction coefficient corresponding to the pressing position based on the pressing position; and, the calculation unit is used to acquire a pressing force value generated by pressing on the touch, pad according to the correction coefficient, the weight coefficient, and the output value.

In an embodiment of the present application, the apparatus further includes a calibration module and a preprocessing unit, wherein the calibration module is used for performing block calibration on the touch pad, calculating and acquiring a correction coefficient of each pressing position on the touch pad by bilinear interpolation, and storing the correction coefficient after associating the correction coefficient with a corresponding pressing position. The preprocessing unit is disposed between the force calculation module and the piezoelectric sensors, and is configured to perform one or more of filtering processing, amplification processing, rectification processing, switching processing, Fourier transforming processing, and wavelet transforming processing on output signals of the piezoelectric sensors to obtain preprocessed voltage signals. Since these preprocessing circuits are common circuits, the present application will not explain them in detail here. In order to save costs in practical work, the apparatus for detecting pressing force on a touch pad may directly use a preprocessing circuit of an electronic device to perform the above preprocessing on voltage signals, or it may independently use a circuit with a corresponding function to perform the above preprocessing on voltage signals.

In an embodiment of the present application, the force calculation module further includes an anti-interference unit configured to compare the pressing force data with a predetermined threshold; calculate and acquire an output value of an output signal of each piezoelectric sensor according to the pressing force data when the pressing, force data is greater than the predetermined threshold; and clear the pressing force data collected by the piezoelectric sensors when the pressing force data is less than or equal to the predetermined threshold.

In actual work, in order to save hardware space, the apparatus for detecting pressing force on the touch pad provided in the present application may integrate hardware other than the touch pad and piezoelectric sensors into a processor MCU, so that a processing circuit of the apparatus for detecting pressing force on the touch pad only consists of a processor MCU and a signal processing circuit. As shown in FIGS. 14A to 14B, in which two piezoelectric sensors 1501 are taken as an example, and the piezoelectric sensors 1501 are directly attached to a touch pad support structure 1503. A processor MCU and a signal processing circuit 1502 are welded and integrated on a left side of a PCB board 1505. Piezoelectric sensors 1501 may be connected with each other through an FPC wire 1507 and finally connected to the PCB 1505 through a connector 1506. A linear motor 1504 may be welded and integrated on a right side of the PCB board 1505, the PCB board 1505 on which the linear motor 1504 is welded is further provided with a soft adhesive or foam 1508, which is used for improving shock feeling of the linear motor 1504.

Figure 15A:
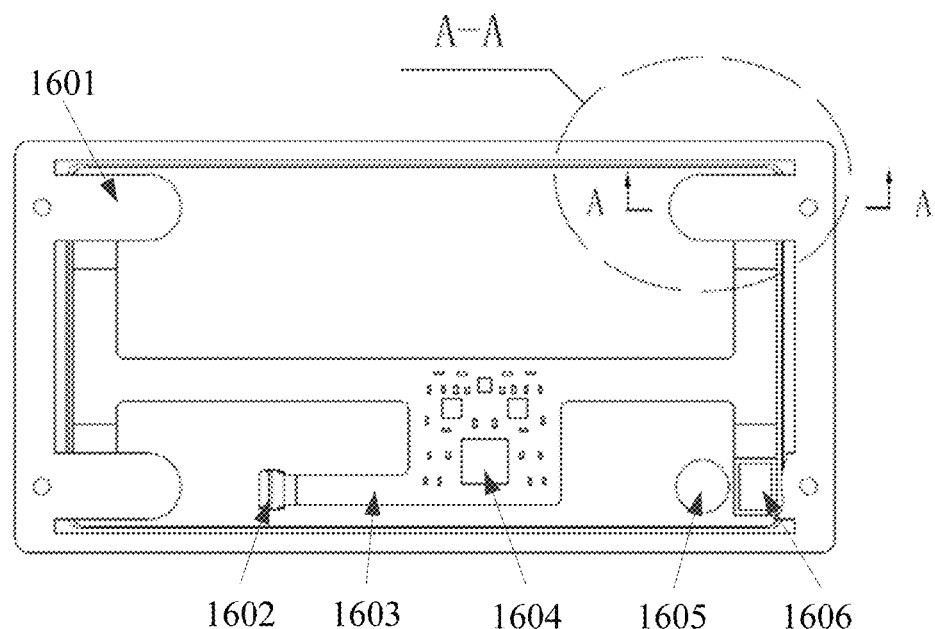
FIGS. 15A to 15B are schematic diagrams of installation of an apparatus for detecting pressing force on a touch pad provided by an embodiment of the present application.
Figure 15B:
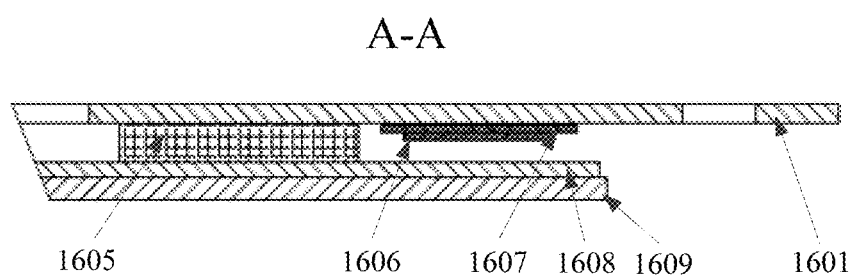

Referring to FIGS. 15A to 15B, in another embodiment of the present application, the processor MCU and the signal processing circuit 1604 is connected to a piezoelectric sensor 1606 disposed at four corners of the touch pad and a PCB board 1608 through an FPC wire 1603. The piezoelectric sensor 1606 is disposed between a touch pad support structure 1601 and the PCB board 1608, as shown in a bottom right corner of FIG. 15A and FIG. 15B, In order to avoid direct contact between the piezoelectric sensor 1606 and the PCB board 1608, a soft adhesive or foam 1605 may be provided between the PCB board 1608 and the touch pad support structure 1601 to provide an interval space. Meanwhile, in order to improve receiving and collecting efficiencies of the piezoelectric sensor 1606, a reinforcing plate 1607 may be disposed between the piezoelectric sensor 1606 and the touch pad support structure 1601, Finally, the PCB board 1608 is attached to an outer substrate 1609, so that pressing information of a user on a substrate 1609 may be collected by using the substrate 1609.

Figure 16:
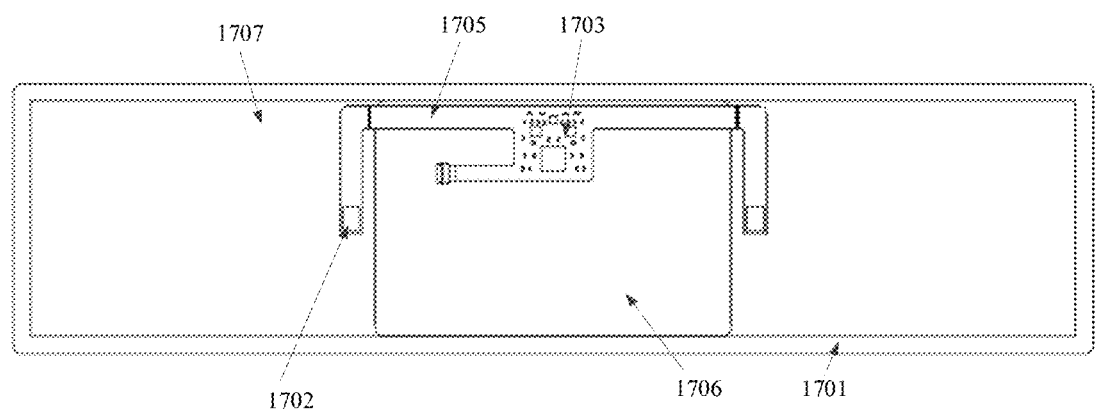
FIG. 16 is a schematic diagram of a partial structure of an apparatus for detecting pressing force on a touch pad provided by an embodiment of the present application.

Referring to FIG. 16, in an embodiment of the present application, the apparatus for detecting pressing force on a touch pad provided by the present application may directly attach a piezoelectric sensor 1702, a PCB board 1706, and a related processing circuit 1703 (a force calculation module, a weight module, a calculation module, etc.) to a substrate 1704 by using a soft connecting material such as a foam or soft adhesive 1701. The substrate 1704 is used as a touch pad, and the substrate 1704 may be glass, touch screen, or another fluid material. The piezoelectric sensor 1702, the PCB board 1706, and the related processing circuit 1703 may still be connected by using an FPC wire 1705. Therefore, in the present embodiment, the apparatus for detecting pressing force on the touch pad provided in the present application may be placed on any rigid material without a bracket structure, to achieve large-area touch recognition. Compared with a capacitive screen or a resistive screen, the present application not only has lower cost, but also has a simpler structure, wider adaptability, and lower power consumption.

An embodiment of the present application further provides a computer device, which includes a memory, a processor, and a computer program stored in the memory and executable on the processor, the aforementioned method are implemented when the computer program is executed by the processor.

An embodiment of the present application further provides a computer readable storage medium, which stores the computer program for implementing the above method.

The embodiment of the present application has advantageous technical effects that the method and apparatus for detecting pressing force on a touch pad provided by the embodiment of the present application may implement detection of force information of finger pressing on the touch pad on a basis of reducing a hardware cost, thereby not only making a structure simpler, lighter in weight, but also saving electricity.

Those of ordinary skill in the art may understand that all or some of the acts in the method, the system, and functional modules/units in the apparatus disclosed above may be implemented as software, firmware, hardware, and an appropriate combination thereof. In hardware implementations, division between functional modules/units mentioned in the above description does not necessarily correspond to division of physical components. For example, a physical component may have multiple functions, or a function or act may be performed by several physical components in cooperation. Some or all of the components may be implemented as software executed by a processor, such as a digital signal processor or a microprocessor, or as hardware, or as an integrated circuit, such as an application specific integrated circuit. Such software may be distributed on a computer readable medium, which may include a computer storage medium (or a non-transitory medium), and a communication medium (or a transitory medium). As is well known to those of ordinary skill in the art, the term "computer storage medium" includes volatile and nonvolatile, removable and non-removable medium implemented in any method or technology for storing information (such as computer readable instructions, a data structure, a program module, or other data). The computer storage medium includes but are not limited to a RAM, a ROM, an EEPROM, a flash memory or another memory technology, a CD-ROM, a Digital Versatile Disk (DVD) or another optical disk storage, a magnetic box, a magnetic tape, a magnetic disk storage, or another magnetic storage apparatuses, or any other medium that may be used to store desired information and may be accessed by a computer. Furthermore, it is well known to those of ordinary skill in the art that a communication medium typically contains computer readable instructions, a data structure, program modules, or other data in a modulated data signal such as a carrier or another transmission mechanism, and may include any information delivery medium.

What is claimed is:

1. A method for detecting pressing force on a touch pad, comprising:
   detecting a pressing operation on the touch pad by an elastic wave sensor arranged under the touch pad to obtain a voltage signal; and
   determining pressing force based on the voltage signal;
   wherein the elastic wave sensor is a piezoelectric sensor;
   the determining the pressing force based on the voltage signal comprises:
   performing an accumulation calculation based on a voltage value of the voltage signal, and determining a value of pressing force according to an accumulation result;
   wherein when there are a plurality of elastic wave sensors, the performing the accumulation calculation based on the voltage value of the voltage signal comprises:
   performing summation of voltage values of voltage signals at the same moment detected by some or all of the elastic wave sensors, and performing an accumulation calculation based on the summed voltage values of voltage signals, wherein voltage values of voltage signals detected by different elastic wave sensors are assigned different weights during the summation;

wherein the performing the accumulation calculation based on the voltage value of the voltage signal comprises:
sampling a voltage signal within a set duration to obtain a voltage value of a valid voltage signal; and
subtracting a set reference value from the voltage value of the valid voltage signal to obtain a difference, accumulating the obtained difference or a difference correction value obtained by correcting the difference and taking an absolute value to obtain the accumulation result;
wherein a current moment is taken as an end moment for the set duration; voltage signals sampled within the set duration are all valid voltage signals, or a voltage signal sampled within the set duration with a difference between a voltage value of the voltage signal and the reference value being within a predetermined range is a valid voltage signal.

2. The method for detecting pressing force on the touch pad according to claim 1, wherein the difference correction value obtained by correcting the difference comprises:
after taking an absolute value of the difference, carrying out a mathematical processing and retaining positivity and negativity of the difference as the difference correction value; or,
taking a difference obtained by subtracting a product of a previous difference and a set ratio from each difference as the difference correction value.

3. The method for detecting pressing force on the touch pad according to claim 1, wherein
the set reference value is a static reference value or a dynamic reference value determined according to a voltage value of a voltage signal within the set duration;
wherein the static reference value is set as an intermediate value of a voltage range of the voltage signal; and
the dynamic reference value is determined in the following way:
when the voltage signal within the set duration is within a predetermined range, taking a result of averaging the voltage value of the voltage signal within the set duration as a reference value within the set duration; or
taking a voltage value forming a moving average of a voltage signal within the set duration as the reference value within the set duration.

4. The method for detecting pressing force on the touch pad according to claim 1, wherein the determining the value of pressing force according to the accumulation result comprises:
converting the accumulation result by using a conversion coefficient between a pressing force value of the voltage signal and a force to determine the value of pressing force;
wherein after converting the accumulation result by using the conversion coefficient between the pressing force value of the voltage signal and the force to determine the value of pressing force, the method further comprises:
correcting the determined value of pressing force using a correction coefficient.

5. The method for detecting pressing force on the touch pad according to claim 1, wherein
the number of elastic wave sensors is at least two;
the determining pressing force based on the voltage signal comprises:
acquiring a first weight coefficient corresponding to an output signal of each elastic wave sensor and a second weight coefficient corresponding to a feature signal of the elastic wave sensor according to an installation position of each elastic wave sensor;
calculating and acquiring a pressing signal impulse value generated by pressing according to the first weight coefficient and the voltage signal;
calculating and acquiring a pressing feature signal impulse value according to the second weight coefficient and the feature signal of the elastic wave sensor; and
acquiring a pressing impulse value generated by pressing on the touch pad according to the pressing signal impulse value and the pressing feature signal impulse value;
wherein the detecting the pressing operation on the touch pad by the elastic wave sensor arranged under the touch pad to obtain a voltage signal comprises:
acquiring a pressing signal generated by finger pressing on a touch pad by the elastic wave sensor arranged under the touch pad, and respectively converting the pressing signal into a corresponding voltage signal.

6. The method for detecting pressing force on the touch pad according to claim 5, wherein the calculating and acquiring the pressing signal impulse value generated by pressing according to the first weight coefficient and the voltage signal comprises: calculating a Root Mean Square value of an output waveform of each elastic wave sensor according to a voltage signal output by each elastic wave sensor; acquiring a signal impulse value output by each elastic wave sensor according to the Root Mean Square value of the output waveform of each elastic wave sensor and the first weight coefficient; and, calculating and acquiring the pressing signal impulse value generated by pressing according to the signal impulse value output by the each elastic wave sensor;
wherein the calculating and acquiring the pressing feature signal impulse value according to the second weight coefficient and the feature signal of the elastic wave sensor comprises: acquiring a feature signal impulse value of each elastic wave sensor according to an amplitude of the feature signal of each elastic wave sensor and the second weight coefficient; calculating and acquiring the pressing feature signal impulse value according to the feature signal impulse value of each elastic wave sensor.

7. The method for detecting pressing force on the touch pad according to claim 5, further comprising:
acquiring a pressing position of the pressing signal generated by finger pressing on the touch pad;
acquiring a corresponding correction coefficient according to the pressing position; and
correcting the pressing impulse value according to the correction coefficient;
wherein the acquiring the corresponding correction coefficient according to the pressing position comprises:
calibrating a plurality of calibration points on the touch pad through a chessboard calibration method; respectively acquiring pressing impulse values of the calibration points under the same pressing force condition; comparing a pressing impulse value of each calibration point with a standard pressing impulse value to obtain a correction coefficient of each calibration point; and
acquiring a correction coefficient corresponding to the pressing position according to a positional relationship between the pressing position and each calibration point and the correction coefficient of each calibration point;

wherein the acquiring the correction coefficient corresponding to the pressing position according to the positional relationship between the pressing position and each calibration point and the correction coefficient of each calibration point comprises: acquiring a correction coefficient corresponding to the pressing position by bilinear interpolation according to the positional relationship between the pressing position and each calibration point and the correction coefficient of each calibration point.

8. The method for detecting pressing force on the touch pad according to claim 1, wherein
the detecting the pressing operation on the touch pad by the elastic wave sensor arranged under the touch pad to obtain a voltage signal comprises:
collecting pressing force data generated by pressing on the touch pad by the elastic wave sensor arranged under the touch pad, wherein the elastic wave sensor is a piezoelectric sensor, and calculating and acquiring a value of a voltage signal output by each piezoelectric sensor according to the pressing force data;
the number of elastic wave sensors is at least two;
the determining pressing force based on the voltage signal comprises:
acquiring a preset weight coefficient according to an installation position of the piezoelectric sensor on the touch pad; and
calculating and acquiring a pressing force value generated by pressing on the touch pad according to the weight coefficient and the value of the voltage signal.

9. The method for detecting pressing force on the touch pad according to claim 8, wherein
the calculating and acquiring the value of the voltage signal output by each piezoelectric sensor according to the pressing force data comprises:
calculating and acquiring an integral value of a voltage signal, after bias is eliminated, of each frame of each piezoelectric sensor at a predetermined frame rate according to the pressing force data; and
calculating and acquiring a value of a voltage signal output by each piezoelectric sensor according to the integral value of each frame of each piezoelectric sensor at a predetermined frame rate;
or
the calculating and acquiring the value of the voltage signal output by each piezoelectric sensor according to the pressing force data comprises:
comparing the pressing force data with a predetermined threshold;
calculating and acquiring a value of a voltage signal output by each piezoelectric sensor according to the pressing force data when the pressing force data is greater than the predetermined threshold; and
clearing the pressing force data collected by the piezoelectric sensor when the pressing force data is less than or equal to the predetermined threshold.

10. The method for detecting pressing force on the touch pad according to claim 8, wherein the calculating and acquiring the pressing force value generated by pressing on the touch pad according to the weight coefficient and the value of the voltage signal comprises:
acquiring a pressing position of pressing force data generated on the touch pad;
acquiring a pre-stored correction coefficient corresponding to the pressing position according to the pressing position; and acquiring a pressing force value generated by pressing on the touch pad according to the correction coefficient, the weight coefficient, and the value of the voltage signal;
wherein the method further comprises:
performing block calibration on the touch pad, calculating and acquiring a correction coefficient of each pressing position on the touch pad by bilinear interpolation, and storing the correction coefficient after associating the correction coefficient with a corresponding pressing position.

11. An apparatus for detecting pressing force on a touch pad, comprising a processor, a touch pad, and an elastic wave sensor; wherein
the touch pad is configured to generate a pressing signal according to a pressing action;
the elastic wave sensor is installed on the touch pad and is configured to respectively convert the pressing signal into a corresponding voltage signal; and
the processor is configured to determine pressing force according to the voltage signal;
wherein the elastic wave sensor is a piezoelectric sensor;
the determining the pressing force based on the voltage signal comprises:
performing an accumulation calculation based on a voltage value of the voltage signal, and determining a value of pressing force according to an accumulation result;
wherein when there are a plurality of elastic wave sensors, the performing the accumulation calculation based on the voltage value of the voltage signal comprises:
performing summation of voltage values of voltage signals at the same moment detected by some or all of the elastic wave sensors, and performing an accumulation calculation based on the summed voltage values of voltage signals, wherein voltage values of voltage signals detected by different elastic wave sensors are assigned different weights during the summation;
wherein the performing the accumulation calculation based on the voltage value of the voltage signal comprises:
sampling a voltage signal within a set duration to obtain a voltage value of a valid voltage signal; and
subtracting a set reference value from the voltage value of the valid voltage signal to obtain a difference, accumulating the obtained difference or a difference correction value obtained by correcting the difference and taking an absolute value to obtain the accumulation result;
wherein a current moment is taken as an end moment for the set duration; voltage signals sampled within the set duration are all valid voltage signals, or a voltage signal sampled within the set duration with a difference between a voltage value of the voltage signal and the reference value being within a predetermined range is a valid voltage signal.

12. The apparatus for detecting pressing force on the touch pad according to claim 11, wherein
the elastic wave sensor is a piezoelectric sensor;
wherein the number of elastic wave sensors is at least two;
the processor is further configured to
acquire a first weight coefficient corresponding to an output signal of each elastic wave sensor and a second weight coefficient corresponding to a feature signal of the elastic wave sensor according to an installation position of each elastic wave sensor;
calculate and acquire a pressing signal impulse value generated by pressing according to the first weight coefficient and the voltage signal, and calculate and acquire a pressing feature signal impulse value according to the second weight coefficient and the feature signal of the elastic wave sensor; and acquire a pressing impulse value generated by pressing on the touch pad according to the pressing signal impulse value and the pressing feature signal impulse value.

13. The apparatus for detecting pressing force on the touch pad according to claim 12, wherein when the elastic wave sensor is a piezoelectric sensor, the piezoelectric sensor comprises a piezoelectric ceramic sensor, a piezoelectric thin film sensor, a piezoelectric crystal sensor, or another sensor with piezoelectric effect.

14. The apparatus for detecting pressing force on the touch pad according to claim 12, wherein the processor is configured to calculate a Root Mean Square value of an output waveform of each elastic wave sensor according to a voltage signal output by each elastic wave sensor, acquire a signal impulse value output by each elastic wave sensor according to the Root Mean Square value of the output waveform of each elastic wave sensor and the first weight coefficient, and calculate and acquire a pressing signal impulse value generated by pressing according to the signal impulse value output by the each elastic wave sensor; and the processor is configured to acquire a feature signal impulse value of each elastic wave sensor according to an amplitude of the feature signal of each elastic wave sensor and the second weight coefficient, and calculate and acquire a pressing feature signal impulse value according to the feature signal impulse value of the each elastic wave sensor.

15. The apparatus for detecting pressing force on the touch pad according to claim 12, where the processor is further configured to acquire a pressing position of a pressing signal generated by finger pressing on the touch pad; and acquire a corresponding correction coefficient according to the pressing position, and correct the pressing impulse value according to the correction coefficient; and the processor is configured to calibrate a plurality of calibration points on the touch pad through a chessboard calibration method, respectively acquire pressing impulse values of the calibration points under the same pressing pressure condition, compare a pressing impulse value of each calibration point with a standard impulse value to obtain a correction coefficient of each calibration point, and acquire a correction coefficient corresponding to the pressing position according to a positional relationship between the pressing position and each calibration point and the correction coefficient of each calibration point;

wherein the calibration unit is configured to acquire the correction coefficient corresponding to the pressing position by bilinear interpolation according to the positional relationship between the pressing position and each calibration point and the correction coefficient of each calibration point.

16. An apparatus for detecting pressing force on a touch pad, comprising an elastic wave sensor and a processor; wherein the elastic wave sensor is arranged under the touch pad and is configured to generate a corresponding detection signal after the touch pad is pressed;

the processor comprises:

a conversion circuit connected to the elastic wave sensor and configured to convert the detection signal into a voltage signal; and a calculation circuit connected to the conversion circuit and configured to determine the pressing force based on the voltage signal, wherein the elastic wave sensor is a piezoelectric sensor; the determining the pressing force based on the voltage signal comprises: performing an accumulation calculation based on a voltage value of the voltage signal, and determining a value of pressing force according to an accumulation result; wherein when there are a plurality of elastic wave sensors, the performing the accumulation calculation based on the voltage value of the voltage signal comprises: performing summation of voltage values of voltage signals at the same moment detected by some or all of the elastic wave sensors, and performing an accumulation calculation based on the summed voltage values of voltage signals, wherein voltage values of voltage signals detected by different elastic wave sensors are assigned different weights during the summation; wherein the performing the accumulation calculation based on the voltage value of the voltage signal comprises: sampling a voltage signal within a set duration to obtain a voltage value of a valid voltage signal; and subtracting a set reference value from the voltage value of the valid voltage signal to obtain a difference, accumulating the obtained difference or a difference correction value obtained by correcting the difference and taking an absolute value to obtain the accumulation result; wherein a current moment is taken as an end moment for the set duration; voltage signals sampled within the set duration are all valid voltage signals, or a voltage signal sampled within the set duration with a difference between a voltage value of the voltage signal and the reference value being within a predetermined range is a valid voltage signal.

17. A non-transitory computer readable and writable storage medium storing computer executable instructions, wherein when the computer executable instructions are executed by a processor, the steps of the method for detecting pressing force on a touch pad according to claim 1 are implemented.

18. A computer device, comprising a memory, a processor, and a computer program stored on the memory and executable on the processor, wherein when the computer program is executed by the processor, the method according to claim 1 is implemented.

* * * * *